United States Patent
Maruno et al.

(10) Patent No.: US 6,191,773 B1
(45) Date of Patent: *Feb. 20, 2001

(54) INTERFACE APPARATUS

(75) Inventors: Susumu Maruno, Osaka; Taro Imagawa, Harakata; Michiyo Moriya, Moriguchi; Kenji Kondo, Neyagawa, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/945,628
(22) PCT Filed: Apr. 25, 1996
(86) PCT No.: PCT/JP96/01124
  § 371 Date: Jan. 2, 1998
  § 102(e) Date: Jan. 2, 1998
(87) PCT Pub. No.: WO96/34332
  PCT Pub. Date: Oct. 31, 1996

(30) Foreign Application Priority Data

Apr. 28, 1995 (JP) .................................................. 7-105551
Oct. 19, 1995 (JP) .................................................. 7-270828
Nov. 1, 1995 (JP) .................................................. 7-284768

(51) Int. Cl.[7] .................................................. G09G 5/08
(52) U.S. Cl. .................................................. 345/158; 345/156
(58) Field of Search .................................................. 66/104, 55, 13, 66/15, 120; 358/403; 379/93.14, 100.08, 88.13, 88.24; 345/427, 156, 157, 158, 173

(56) References Cited

U.S. PATENT DOCUMENTS

| | | | | |
|---|---|---|---|---|
| 5,594,469 | * | 1/1997 | Freeman et al. | 345/158 |
| 5,767,842 | * | 6/1998 | Korth | 345/173 |
| 5,864,334 | * | 1/1999 | Sellers | 345/158 |

FOREIGN PATENT DOCUMENTS 8-16781 * 1/1996 (JP) .

OTHER PUBLICATIONS

"Wideo–Based Handshape Recognition Using a Handshape Structure Model in Real Time" Grobel et al., 1996 IEEE, pp. 446–450, 1996.*

* cited by examiner

Primary Examiner—Dennis-Doon Chow
(74) Attorney, Agent, or Firm—Ratner & Prestia

(57) ABSTRACT

The invention relates to an interface apparatus for making input and output of appliances having display such as computer, word processor, information appliance and television, comprising recognizing means for recognizing the shape or move of the hand of an operator, display means for displaying the features of the shape or move of the hand recognized by the recognizing means as special shape in the screen, and control means for controlling the information displayed in the screen by the special shape displayed in the screen by the display means, wherein the two-dimensional or three-dimensional information displayed in the screen can be selected, indicated or moved only by changing the shape or moving the hand, so that the interface apparatus of very excellent controllability and high diversity may be presented.

6 Claims, 26 Drawing Sheets

1
FIG. 6(A)
2
FIG. 6(B)
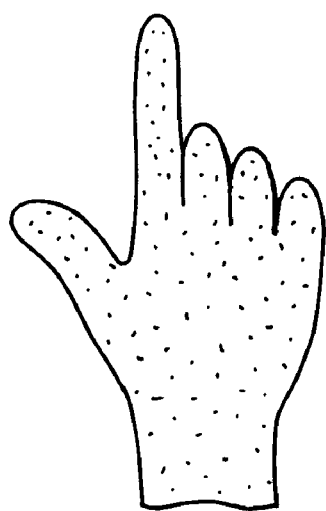
FIG. 6(C)
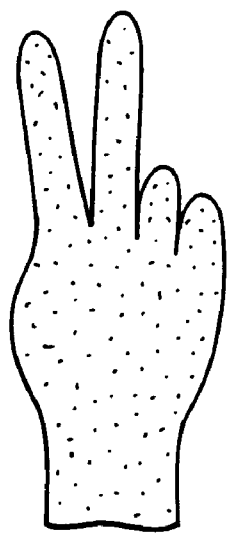
FIG. 6(D)

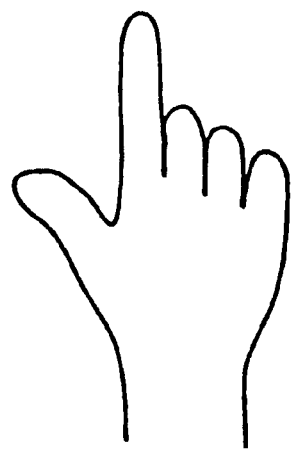
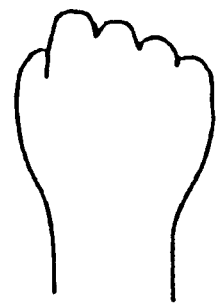
FIG. 10(A)   FIG. 10(B)
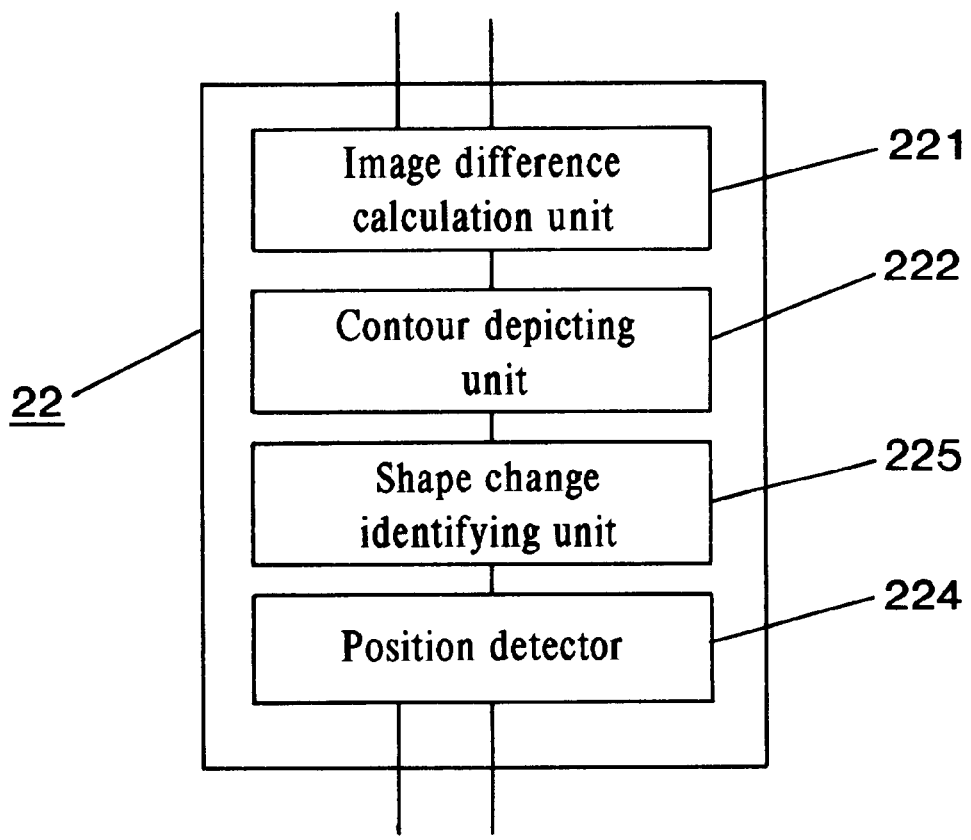
FIG. 11

Cube

Plane

Example of configuration on virtual space (front view)

Example of configuration on virtual space (side view)

INTERFACE APPARATUS

This Application is a U.S. National Phase Application of PCT International Application PCT/JP96/01124.

BACKGROUND OF THE INVENTION

The present invention relates to an interface apparatus for input and output of information apparatus such as computer and word processor and appliance having a display such as television.

In a kind of conventional interface apparatus, it is designed to display a cursor at a coordinate position detected by the mouse on a display screen, for adding some other information to the information in the display device, or changing or selecting the displayed information.

FIG. 30 shows an outline of this conventional interface apparatus. In FIG. 30, reference numeral 501 denotes a host computer, and 502 is a display, and virtual operation buttons 503, 504, 505 are displayed in the display 502 by the host computer 501. Reference numeral 506 represents a mouse cursor, and the host computer 501 controls the display so as to move in the screen in synchronism with the move of the mouse 507, on the basis of the moving distance of the mouse 507 detected by the mouse 507. As the user moves the mouse 507, the mouse cursor 506 is moved to the position of a desired virtual operation button in the display screen, and by pressing a switch 508 on the mouse 507, an operation button is selected so as to instruct action to the host computer 501.

In this conventional construction, however, the mouse or the input device is necessary in addition to the main body of the appliance, and a table or area for manipulating the mouse is also needed, which is not suited to portable information appliance or the like. Besides, by manipulation through the mouse, it is not a direct and intuitive interface.

SUMMARY OF THE INVENTION

It is an object of the invention to present an interface apparatus capable of manipulating an appliance easily without requiring input device such as keyboard and mouse. It is other object thereof to present an interface apparatus further advanced in the ease of manipulation of indicating or catching the display object by judging interactions along the intent of the operator sequentially and automatically.

In structure, the invention provides an interface apparatus comprising recognizing means for recognizing the shape of a hand of an operator, display means for displaying the features of the shape of the hand recognized by the recognizing means on the screen as a special shape, and control means for controlling the information displayed in the screen by the special shape displayed in the screen by the display means, whereby the information displayed in the screen can be controlled only by varying the shape of the hand.

It is a further object to present an interface apparatus much superior in ease of manipulation by recognizing also the move of the hand. To recognize the move, a frame memory for saving the image picking up the shape or move of the hand, and a reference image memory for storing the image taken before the image saved in the frame memory as reference image are provided, and it is achieved by depicting the difference between the image in the frame memory and the reference image stored in the reference image memory. In other method of recognition, the shape or move of the hand of the user in the taken image is depicted as the contour of the user, and its contour is traced, and the relation between the angle of the contour line and the length of contour line, that is, the contour waveform is calculated and filtered, and the shape waveform expressing the specified shape is generated.

Moreover, comprising cursor display means for displaying a feature of the shape of a hand on the screen as a special shape and manipulating as cursor, means for storing the relation with display object other than cursor displays the coordinates and shape of the representative point representing the position of the display object other than cursor display, and means for calculating and judging the interaction of the cursor display and the display object, manipulation is realized smoothly by the interactions along the intent of the operator when gripping the displayed virtual object in the case of display of cursor display as virtual manipulator.

In the interface apparatus thus constructed, as the user faces the recognizing means and shows, for example, a hand, the special shape corresponding to the shape of the hand is displayed as an icon in the screen for screen manipulation, so that control according to the icon display is enabled.

Or when instructed by hand gesture, the given hand gesture is displayed as a special shape set corresponding to the shape of the hand on the display screen, and its move is also displayed, and, for example, a virtual switch or the like displayed on the display screen can be'selected by the hand gesture, or the display object displayed on the screen can be grabbed or carried depending on the purpose, and therefore without requiring mouse or other input device, a very simple manipulation of appliance is realized.

It is further possible to realize the interface much enhanced in the ease of manipulation by sequentially and automatically judging the interaction with the display object desired to be operated by the virtual manipulator according to the intent of operation of the operator, as the special shape set corresponding to the shape of the hand works as virtual manipulator aside from the mere cursor.

BRIEF DESCRIPTION OF THE DRAWINGS

FIG. 6 is a diagram showing an example of icon generated by an icon generating unit in the same embodiment;

FIG. 10 is a diagram showing an example of shape of hand judged by the interface apparatus of the same embodiment;

FIG. 11 is a diagram showing an example of motion recognizing unit of the interface apparatus of the same embodiment;

Figure 23A:
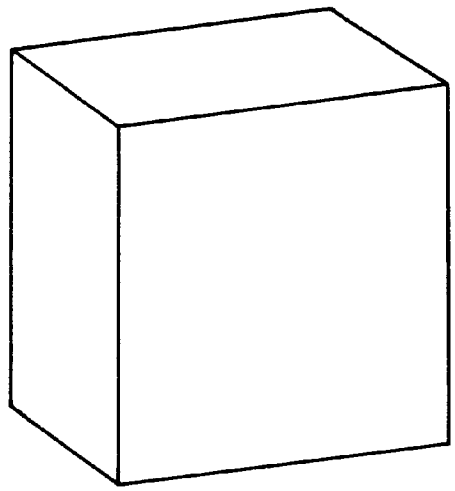
Figure 24A:
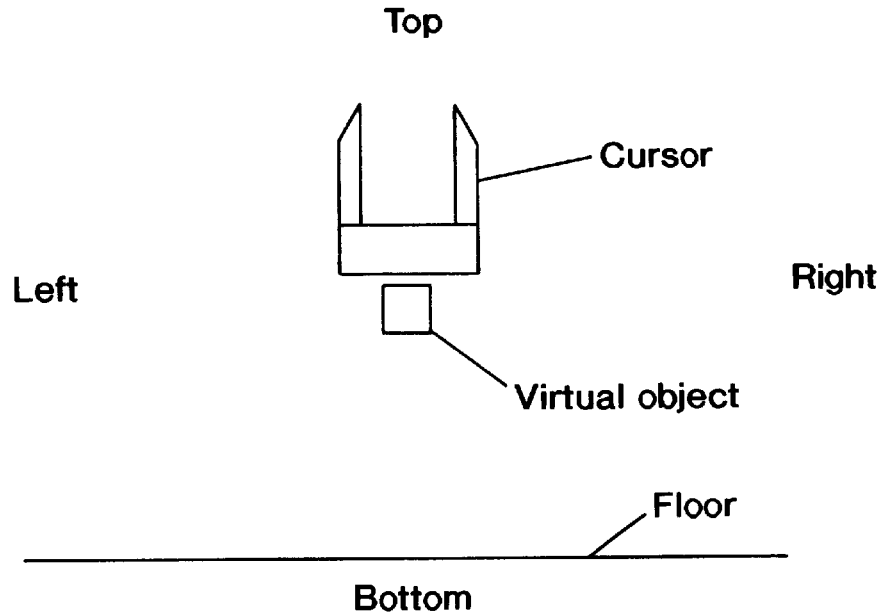
Figure 25:
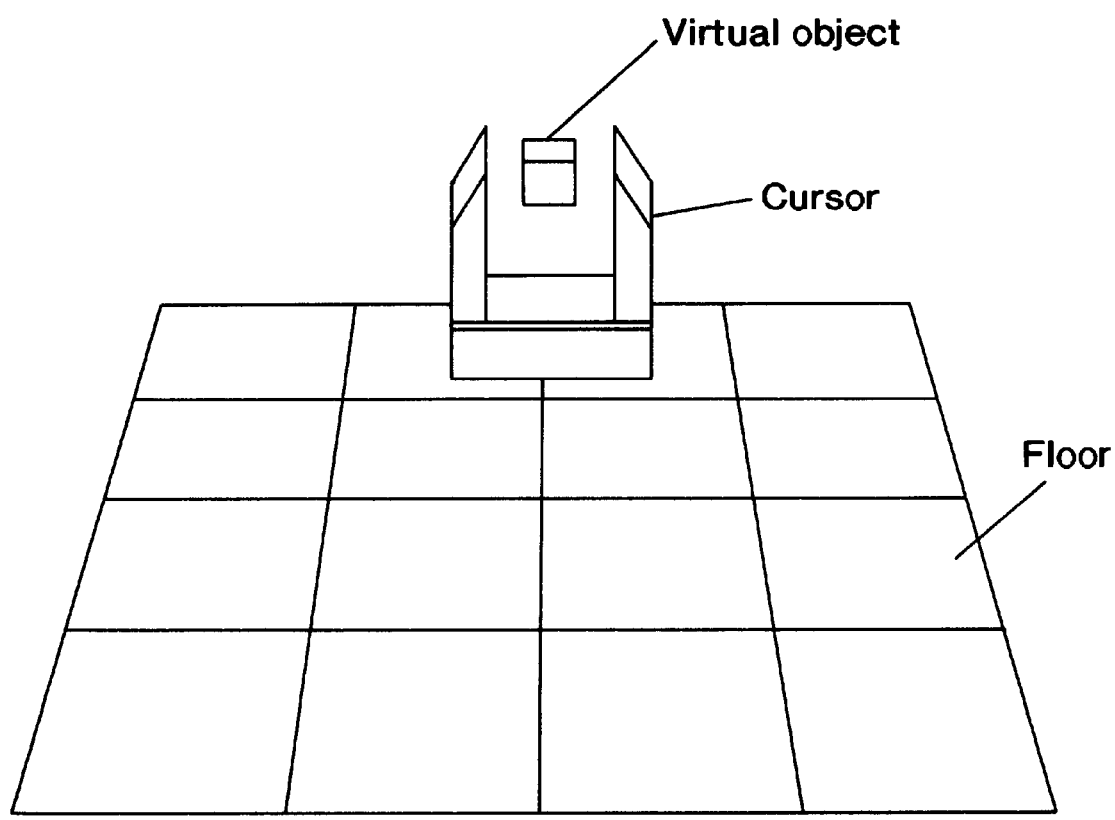
Figure 26:
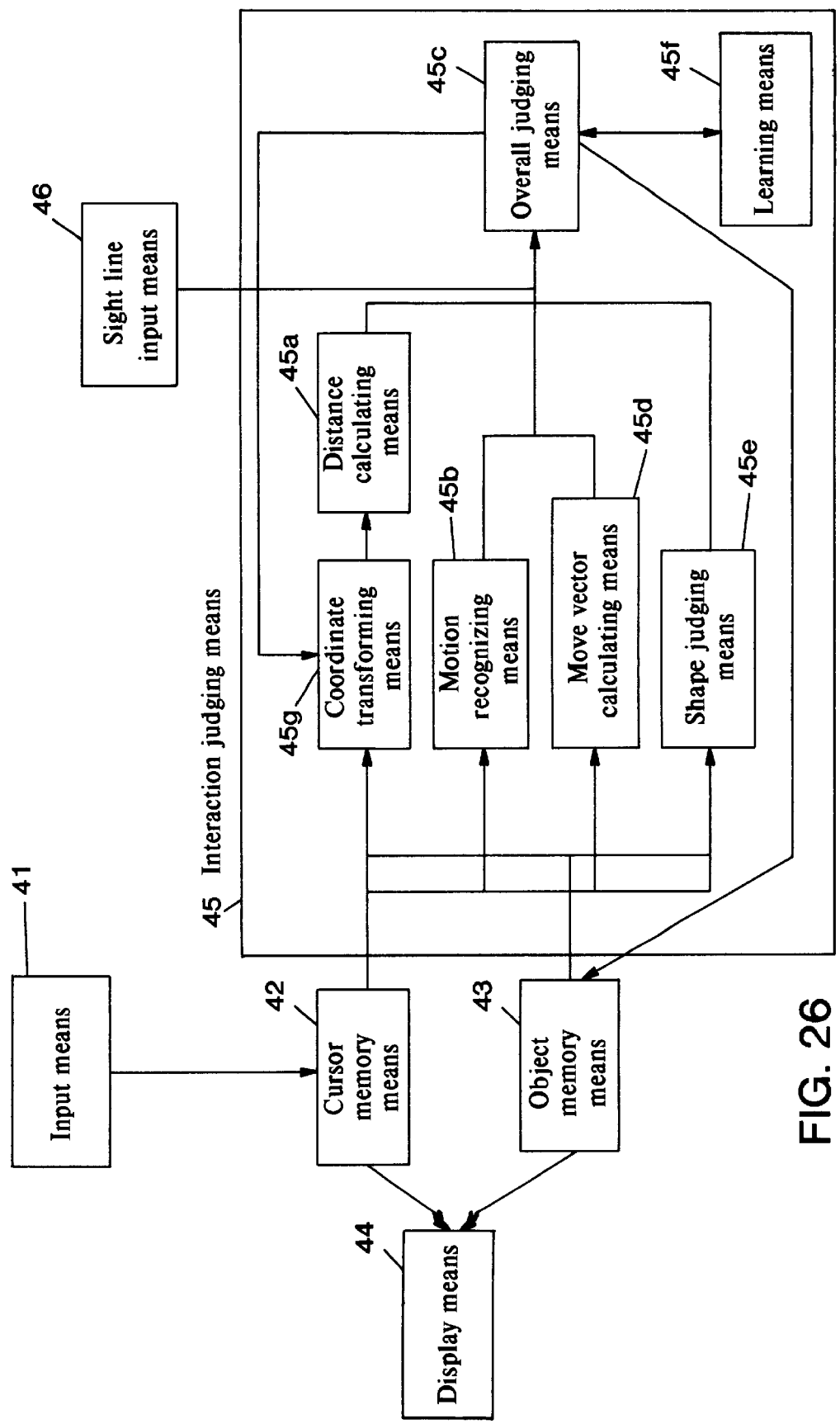
Figure 27A:
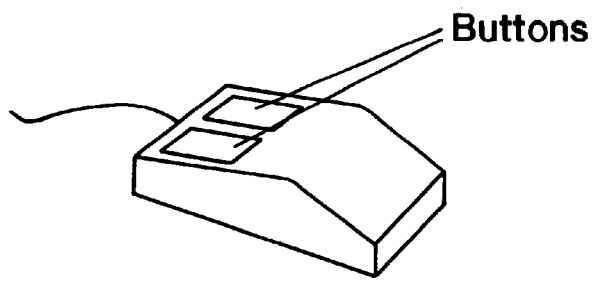
Figure 28A:
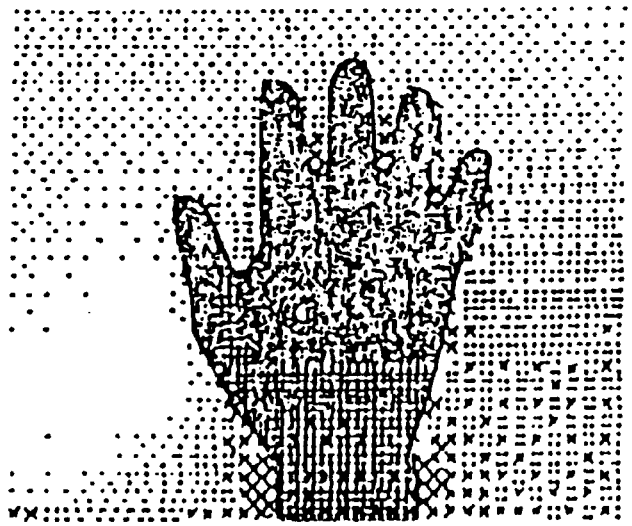
Figure 29A:
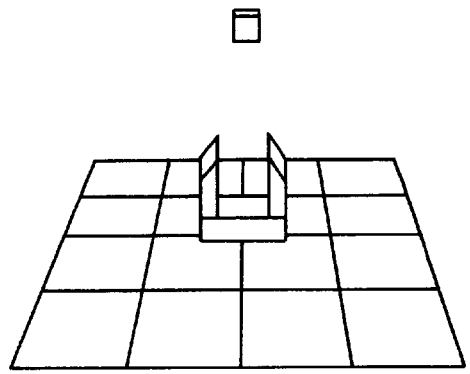

(b) is a diagram showing a closed state of the same embodiment;

(c) is a diagram showing an open state of cursor in an example of a cursor used in the interface apparatus of the same embodiment;

(d) is a diagram showing a closed state of the same embodiment;

(e) is a diagram showing an open state of cursor in an example of a cursor used in the interface apparatus of the same embodiment;

(f) is a diagram showing a closed state of the same embodiment;

FIG. 23(a) is a diagram showing the shape of an example of a virtual object used in the interface apparatus of the same embodiment;

(b) is a diagram showing the shape of other example of a virtual object used in the interface apparatus of the same embodiment;

FIG. 24(a) is a front view showing configuration of cursor and virtual object in a virtual space;

(b) is a side view showing configuration of cursor and virtual object in a virtual space;

FIG. 25 is a diagram showing a display example of virtual space for explaining the embodiment;

FIG. 26 is a block diagram showing an example of the interface apparatus of the same embodiment;

FIG. 27(a) is a diagram showing an example of input device in input means used in the interface apparatus of the same embodiment;

(b) is a diagram showing an example of input device in input means used in the interface apparatus of the same embodiment;

(c) is a diagram showing an example of input device in input means used in the interface apparatus of the same embodiment;

FIG. 28(a) is a diagram showing an example of image of a hand taken by a camera in the same embodiment;

(b) is a diagram showing a binary example of image of a hand taken by a camera in the same embodiment;

FIG. 29(a) is a diagram showing an example of image displayed by display means used in the interface apparatus in the same embodiment of the invention;

(b) is a diagram showing a second example of the display screen;

(c) is a diagram showing a third example of the display screen;

(d) is a diagram showing a fourth example of the display screen; and

Figure 30:
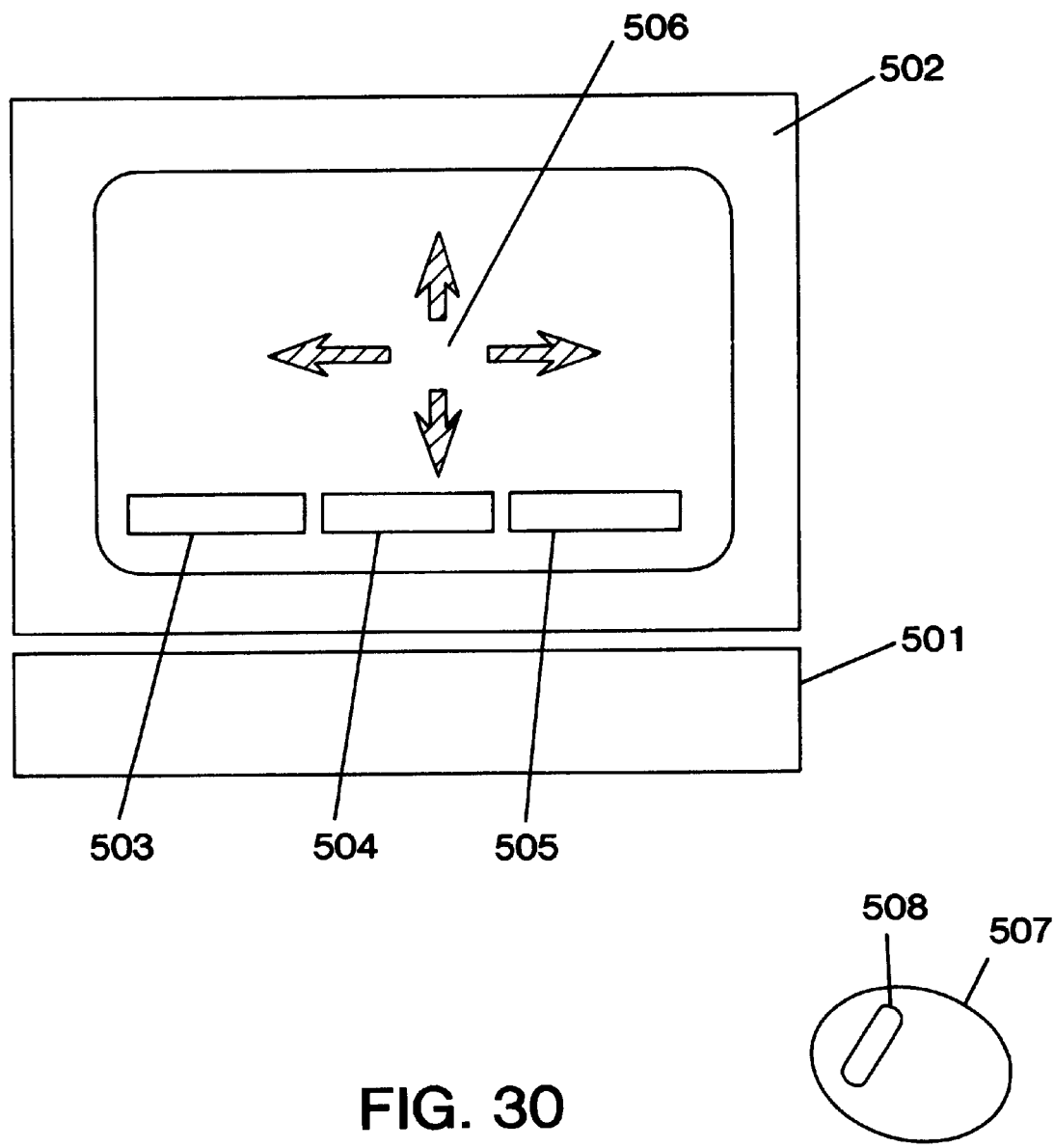

FIG. 30 is an explanatory diagram for explaining a conventional interface apparatus.

DESCRIPTION OF THE PREFERRED EMBODIMENTS (First embodiment)

A first embodiment of the invention relates to an interface comprising recognizing means such as image pickup device for recognizing the shape of a hand of the operator, display means for displaying the feature of the shape of the hand recognized by the recognizing means on a screen as a special shape by an icon or the like, and control means for controlling the information displayed on the screen by varying the shape of the hand by operating the special shape such as icon displayed on the screen by the display means as the so-called cursor.

Figure 1:
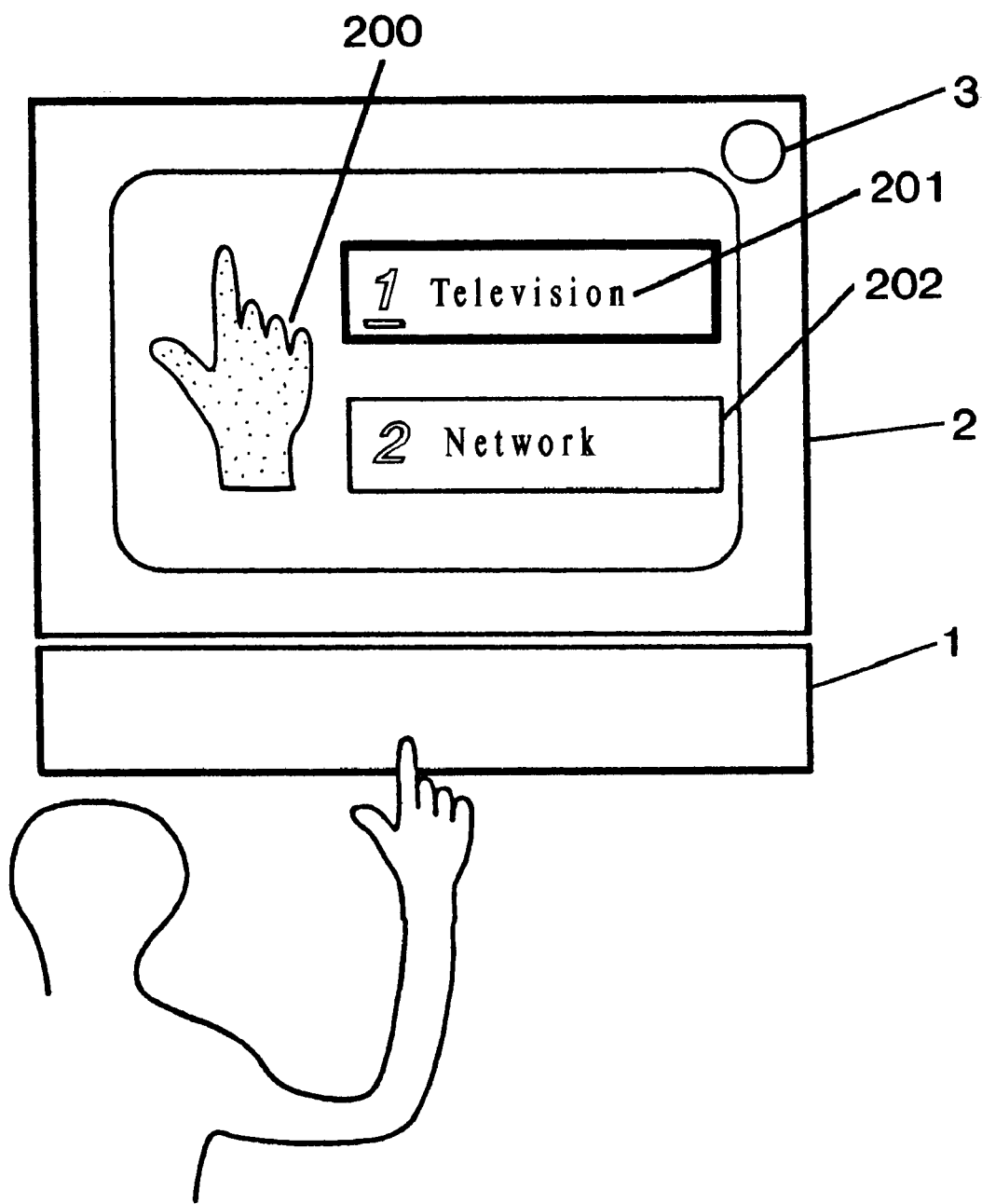
FIG. 1 is an appearance drawing of an interface apparatus in a first embodiment of the invention.

FIG. 1 shows the appearance of the first embodiment of the interface apparatus of the invention. Reference numeral 1 denotes a host computer, 2 is a display unit, and 3 is a CCD camera for picking up an image. The CCD camera 3 has the pickup surface located in the same direction as the display direction, so that the shape of the hand of the user can be picked up when the user confronts the display screen. On the display, menu 201, 202, and icon 200 reflecting the shape of the hand are displayed.

Figure 2:
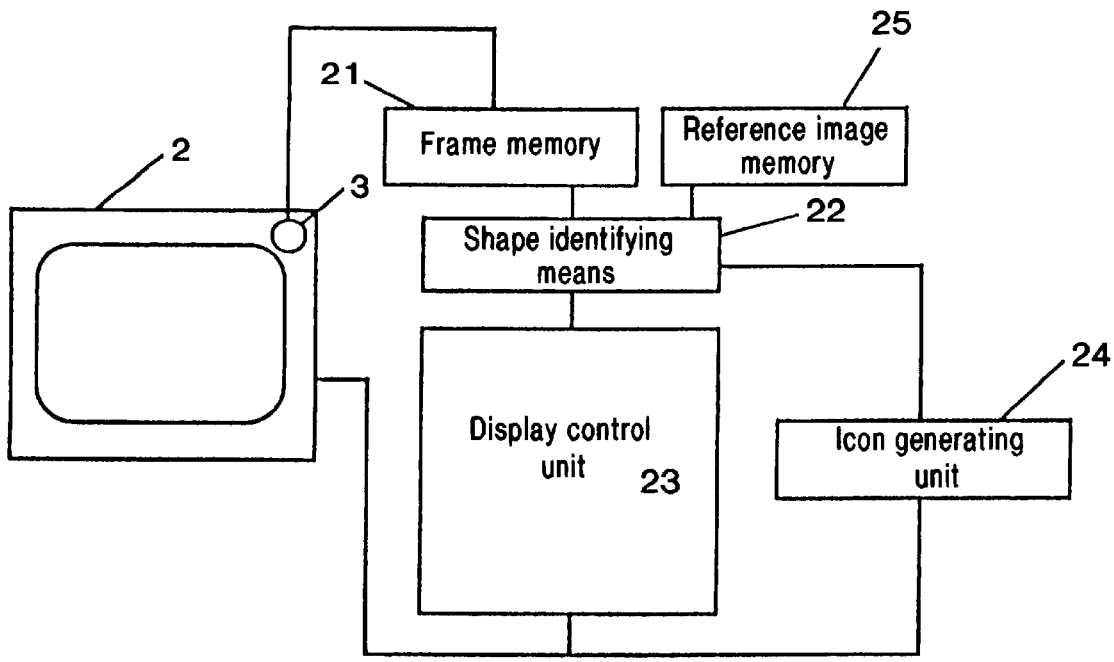
FIG. 2 is a detailed block diagram of the interface apparatus in the same embodiment of the invention.

FIG. 2 is a detailed block diagram of the invention. The image fed in from the CCD camera is stored in a frame memory 21. In a reference image memory 25, a background image not including person taken previously is stored as reference image. The reference image may be updated whenever as required.

Figures 3A, 3B:
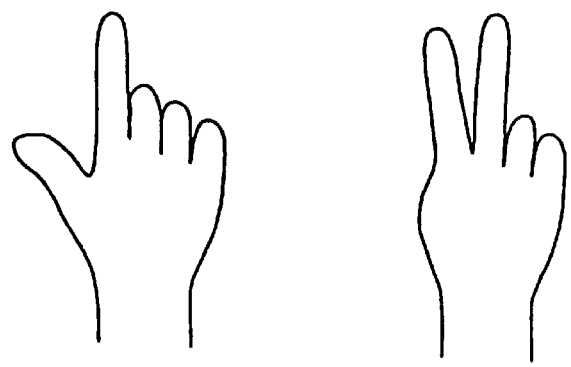
FIG. 3 is a diagram showing an example of shape of hand judged by the interface apparatus in the same embodiment of the invention.
Figure 3C:

Shape identifying means 22 depicts the difference of the image saved in the frame memory and the image stored in the reference image memory, and removes the background image from the image, depicts, for example, the portion corresponding to the hand of the user, and judges if the shape is, for example, one finger as shown in FIG. 3(A), two fingers as shown in FIG. 3(B), or three fingers as shown in FIG. 3(C).

Figure 4:
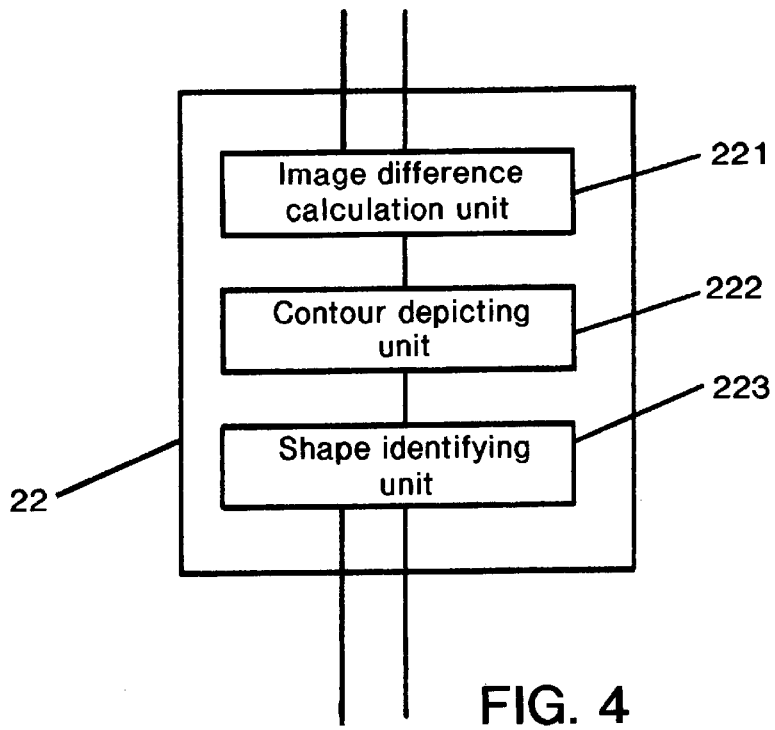
FIG. 4 is a diagram showing an example of shape identifying means of the interface apparatus in the same embodiment of the invention.

FIG. 4 shows a detailed example of the shape identifying means 22, which comprises an image difference operation unit 221, a contour depicting unit 222, and a shape identifying unit 223.

Figure 5:
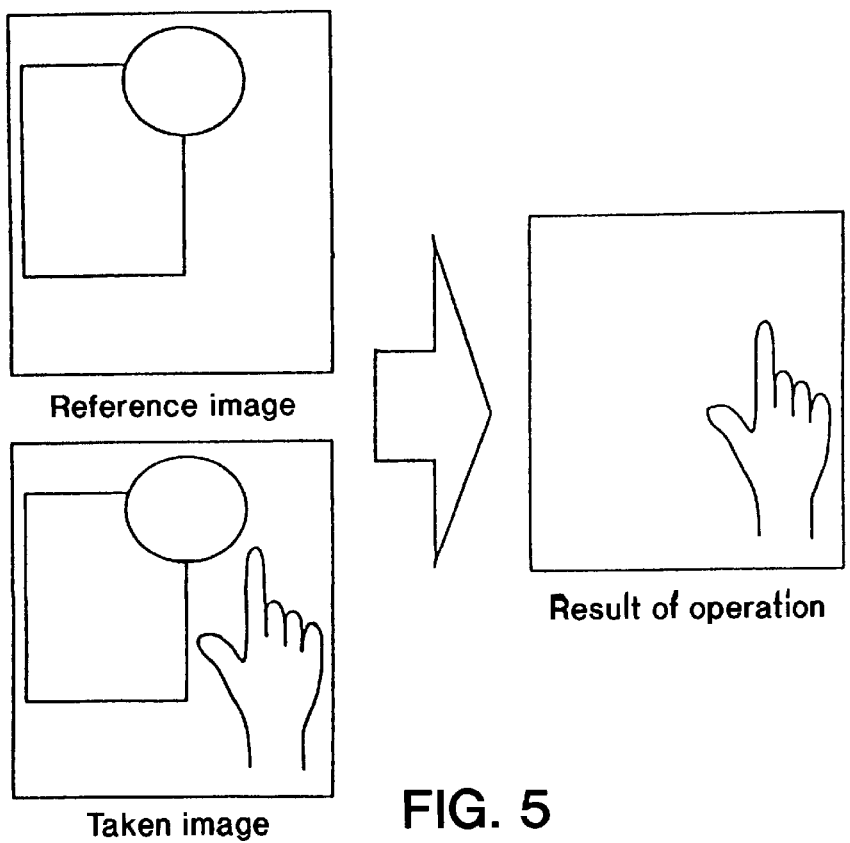
FIG. 5 is a diagram showing an example of operation by an image difference operation unit in the same embodiment.

The image difference operation unit 221 calculates the difference of the image saved in the frame memory and the image stored in the reference image memory as mentioned above. As a result, the object to be detected, for example, the user, can be separated from the background portion. For example, when the image difference operation unit 221 is composed of a simple subtraction circuit, as shown in FIG. 5, only the portion of the hand of the user in the image in the frame memory can be depicted. The contour depicting unit 222 depicts the contour shape of the object existing in the image as a result of operation by the image difference operation unit 221. As a practical method, for example, by depicting the edge of the image, the contour shape may be easily depicted.

The shape identifying unit 223 identifies specifically the contour shape of the hand depicted by the contour depicting unit 222, and judges if the shape is, for example, one finger as shown in FIG. 3(A) or two fingers as shown in FIG. 3(B). As the shape identifying method, for example, template matching, matching technique with shape model, and neural network may be employed, among others.

An icon generating unit 24 generates an icon image as a special shape to be shown in the display, on the basis of the result of identifying the hand shape by the shape identifying unit 223. For example, when the result of identifying the shape of the hand was one finger, an icon of numeral "1" is generated as shown in FIG. 6(A), or in the case of two fingers, an icon of numeral "2" is created as in FIG. 6(B). As the shape of the icon, alternatively, when the result of identifying the shape of the hand was one finger, an icon of one finger may be shown as shown in FIG. 6(C), or in the case of two fingers, an icon of two fingers may be created as shown in FIG. 6(D). A display controller 23 controls the display on the basis of the result of identifying the shape of the hand by the shape identifying unit 223. For example, while displaying the icon according to the result of identifying, the menu previously corresponding to the result of identifying is displayed by emphasis on the basis of the hand shape identifying result.

Figure 7A:
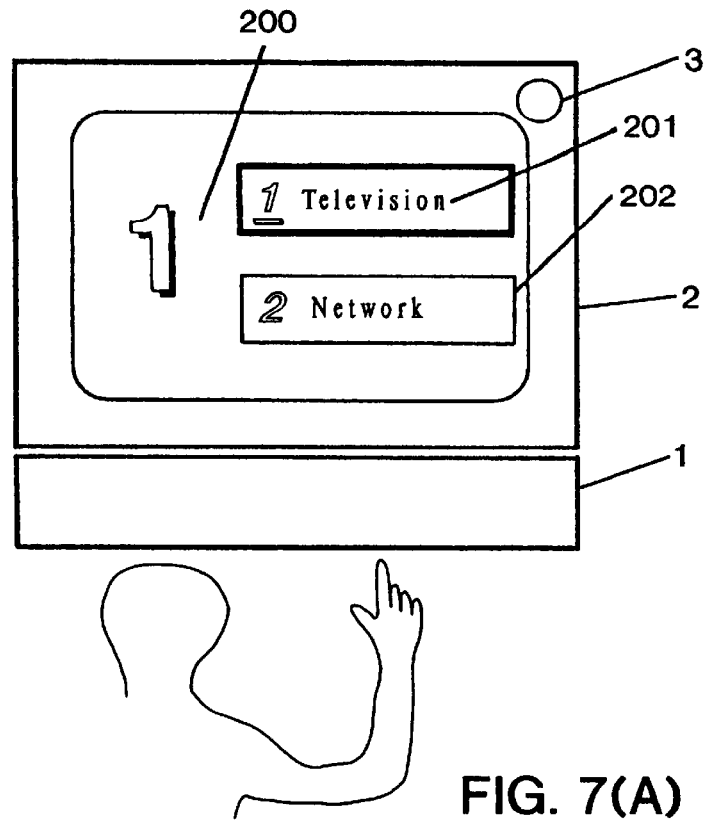
FIG. 7 is an appearance drawing showing an operation example of the interface apparatus of the same embodiment.
Figure 7B:
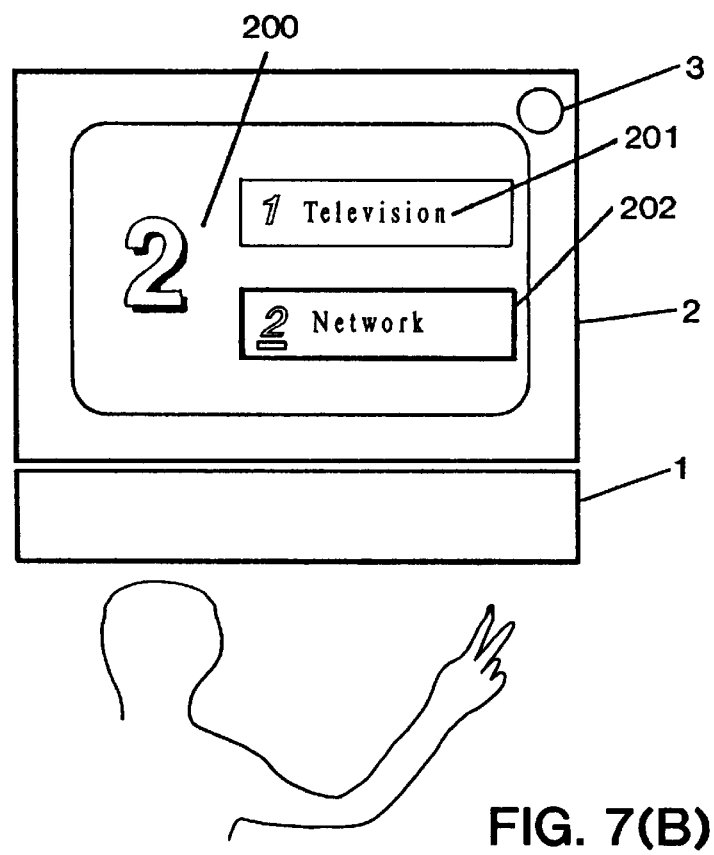
Figure 7C:
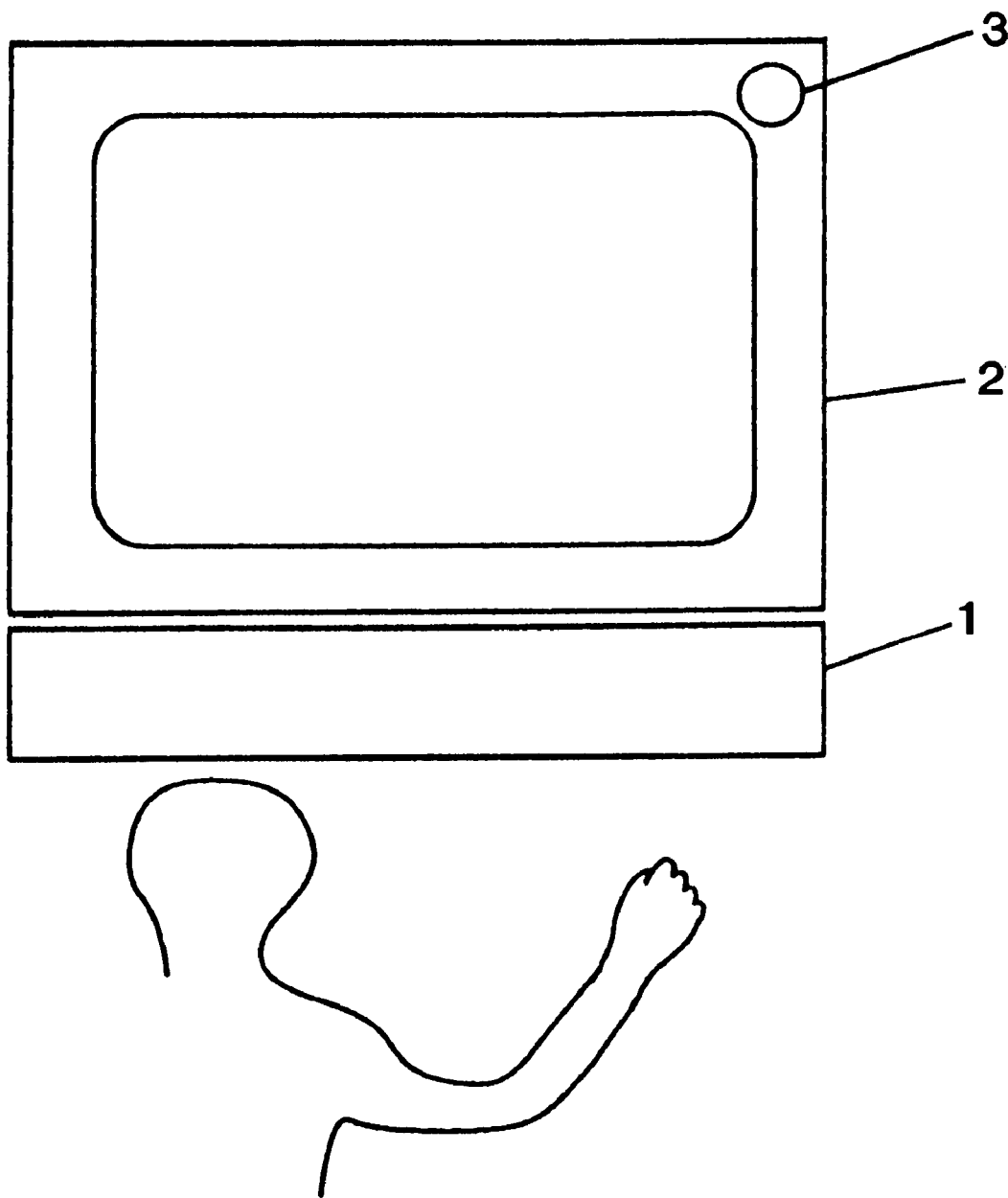

In this embodiment of the invention, an example of operations described below. As shown in FIG. 7(A), when the user confronts the appliance having the interface apparatus of the invention and points out one finger, an icon of numeral "1" is shown on the display, and the display of television on the first menu is shown by emphasis. At this time, by using sound or voice from the display device in tune with the emphasis display, the attention of the operator may be attracted. Herein, by pointing out two fingers as in FIG. 7(B), an icon of numeral "2" is shown on the display and the display of network on the second menu is shown by emphasis. In this state, by maintaining the same hand shape for a specific time, the second menu is selected, and an instruction is given to the host computer so as to display the network terminal. For selection of menu, sound or the like may be used at the same time. In the case of hand shape different from those determined preliminarily as in FIG. 7(C), icon and menu are not shown on the display, and no instruction is given to the host computer.

Thus, according to the invention, by identifying the shape of the hand in the taken image, it is possible to control the computer or appliance on the basis of the result of identifying, and it is possible to manipulate without making contact from a remote distance without using keyboard, mouse or other device. Besides, as the result of identifying the shape of the hand is reflected in the screen, the user can manipulate while confirming the result of identifying, and ease and secure manipulation is possible.

In this embodiment, this is an example of applying in selection of menu, but by pressing so that the icon display according to a specific shape of hand may be replaced by picture or message, it is also possible to control display and writing of picture or message.

(Second embodiment)

A second embodiment of the invention relates to an interface apparatus comprising a frame memory composed at least of an image pickup unit, a motion recognizing unit for recognizing the shape or move of an object in a taken picture, and a display unit for displaying the shape or move of the object recognized by the motion recognizing unit, for storing the image taken by the image pickup unit, and a reference image memory for storing the image taken before the image saved in the frame memory as reference image, wherein the motion recognizing unit comprises an image change depicting unit for depicting the difference between the image in the frame memory and the reference image stored in the reference image memory.

Figure 8:
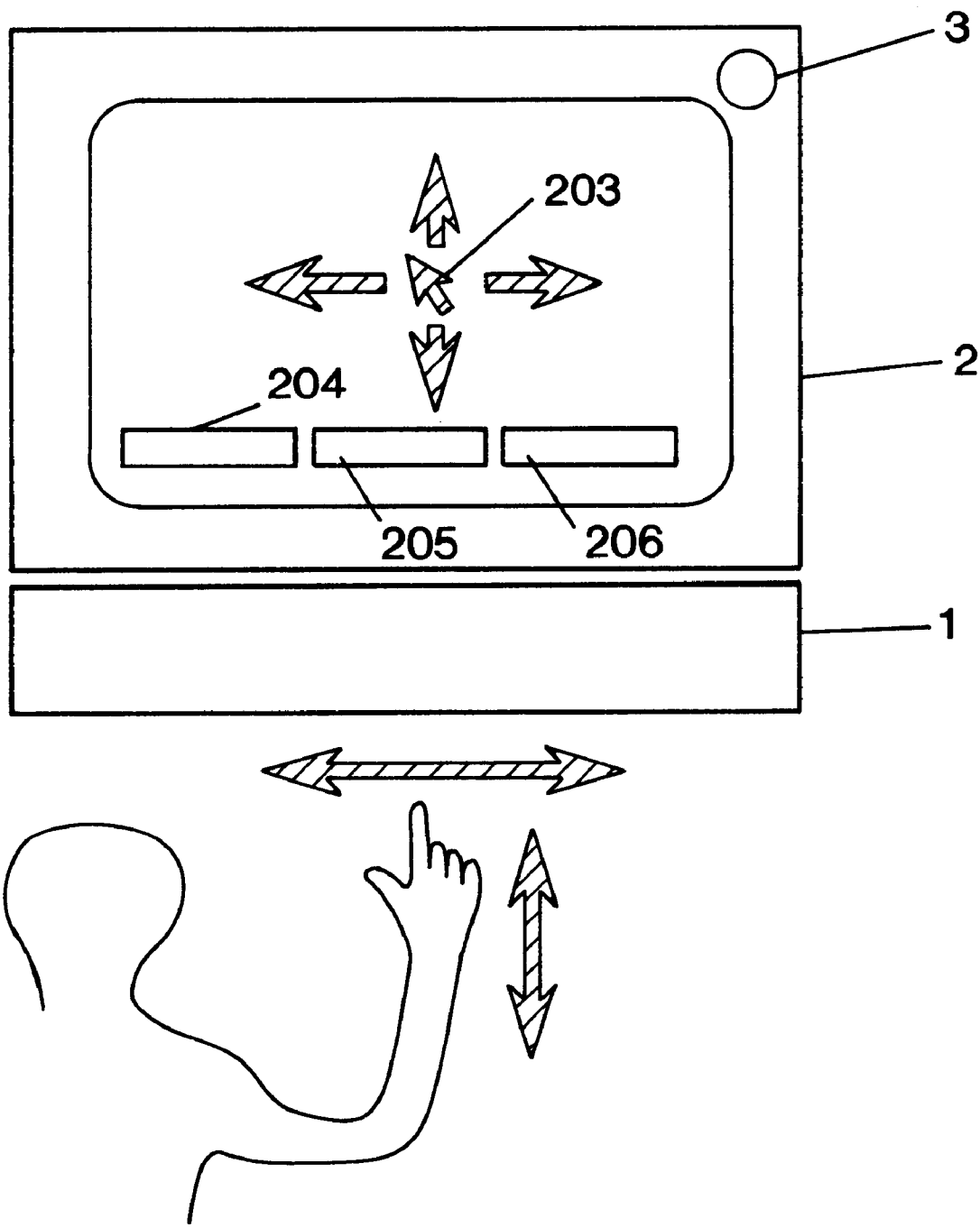
FIG. 8 is an appearance drawing of an interface apparatus in a second embodiment of the invention.

FIG. 8 shows the appearance of the second embodiment of the interface apparatus of the invention. In FIG. 8, same constituent elements as in the first embodiment are identified with same reference numerals. That is, reference 1 is a host computer, 2 is a display unit, and 3 is a CCD camera for picking up an image. The CCD camera 3 has an image pickup surface located in the same direction as the display direction, so that the hand gesture of the user can be picked up as the user confronts the display surface. On the display surface of the display unit 2, virtual switches 204, 205, 206, and an icon of an arrow cursor 203 for selecting the virtual switches are displayed.

Figure 9:
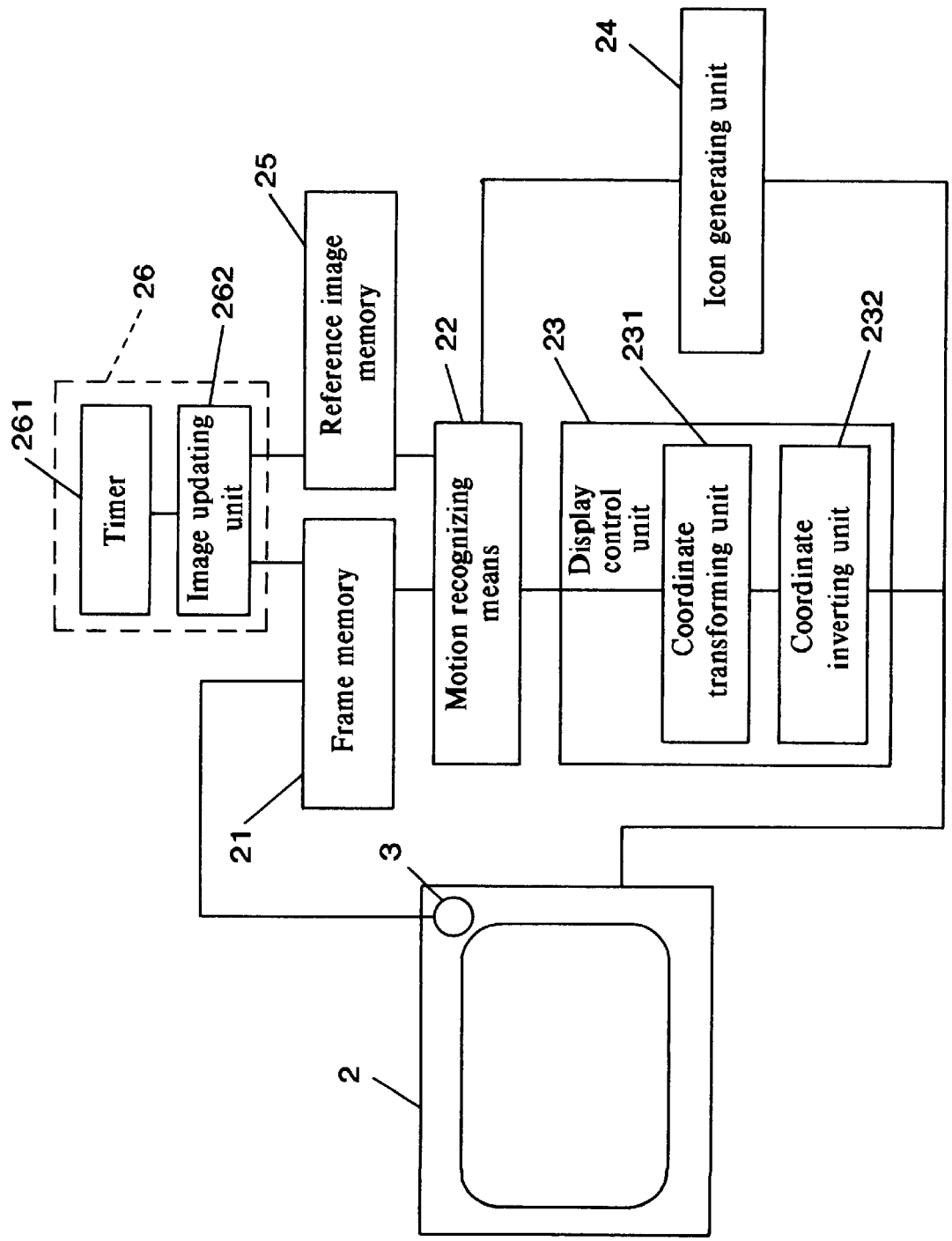
FIG. 9 is detailed block diagram of the interface apparatus in the second embodiment of the invention.

FIG. 9 is a block diagram showing a specific constitution of the embodiment. The image fed through the CCD camera 3 is saved in a frame memory 21. A preliminarily taken image is stored in a reference image memory 25 as a reference image. A reference image updating unit 26 is composed of a timer 261 and an image updating unit 262, and is designed to update the reference image by transferring the latest image stored in the frame memory 21 to the reference image memory 25 at a specific time interval indicated by the timer 261.

An motion recognizing unit 22 depicts the difference between the image saved in the frame memory and the image stored in the reference image memory, and eliminates the background image from the image, and depicts the portion corresponding, for example, to the hand of the user, and also judges if the shape is one finger as shown in FIG. 10(A) or a fist as shown in FIG. 10(B).

FIG. 11 shows a detailed example of the motion recognizing unit 22, being composed of an image difference operation unit 221, a contour depicting unit 222, a shape change identifying unit 225, and a position detector 224.

Figure 12:
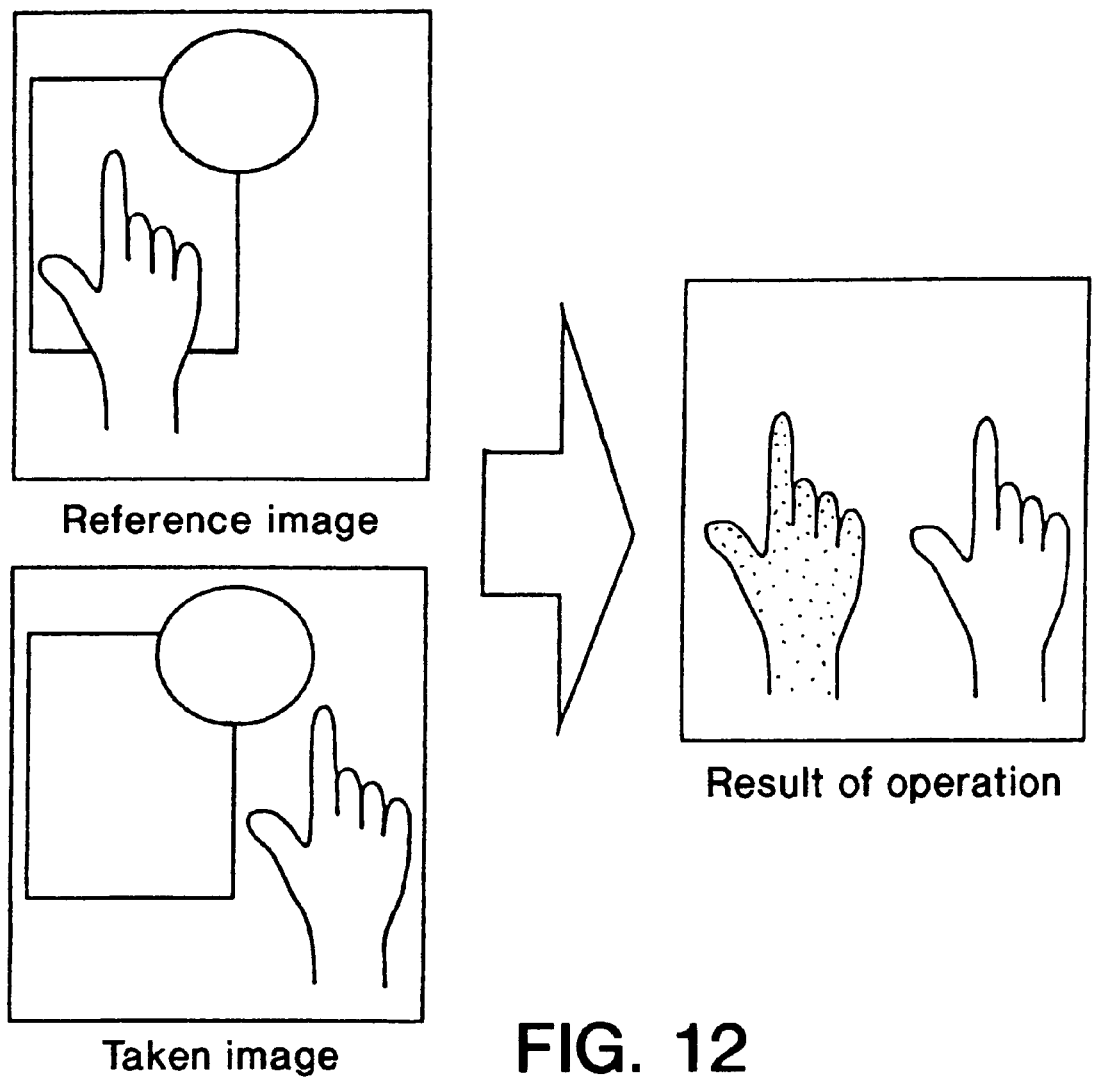
FIG. 12 is a diagram showing an example of operation by an image difference operation unit in the same embodiment.

The image difference operation unit 221 calculates the difference between the image saved in the frame memory 21 and the image stored in the reference image memory 25 as mentioned above. Consequently, the object desired to be depicted as motion, for example, the hand portion of the user, can be separated from the background portion, and only the moving object image can be depicted at the same time. For example, when the image difference operation unit 221 is composed of a mere subtraction circuit, as shown in FIG. 12, the hand portion in the reference image and only the hand portion of the latest image in the frame memory can be depicted, so that only the moving hand portion can be easily identified. The contour depicting portion 222 depicts the object existing in the image as the result of operation by the image difference operation unit 221, that is, the contour shape of the hand portion before moving and after moving. As an example of practical method, by depicting the edge of the image, the contour shape can be easily depicted.

The shape change identifying unit 225 identifies the detail of the contour shape of the hand portion after moving being depicted by the contour depicting unit 222, and judges if the shape is, for example, a finger as shown in FIG. 10(A), or a fist as shown in FIG. 10(B). At the same time, the position detector 224 calculates the coordinates of the center of gravity of the contour shape of the hand portion of the user after moving.

Figure 13A:
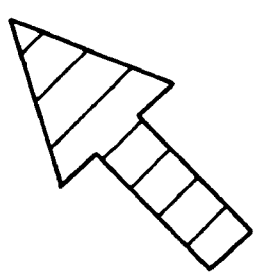
FIG. 13 is a diagram showing an operation example of the same embodiment.
Figure 13B:
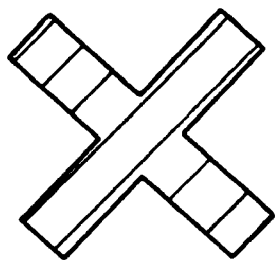
Figure 13C:
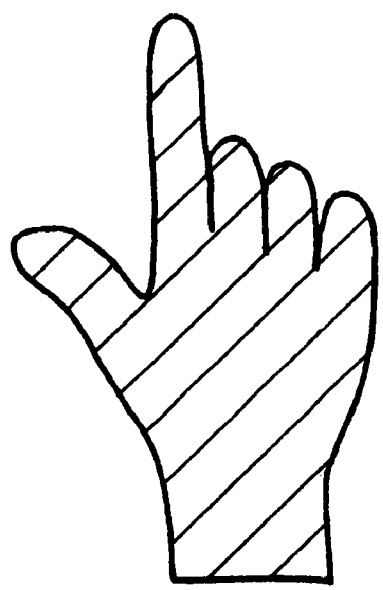
Figure 13D:
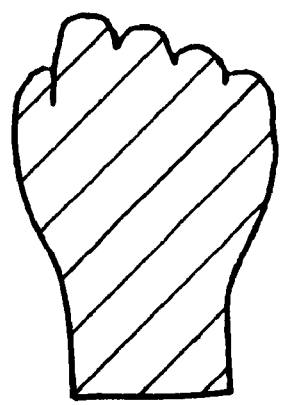

An icon generating unit 24 generates an icon image to be shown on the display on the basis of the result of identifying the hand shape by the shape change identifying unit 225. As examples of icon image, for example, when the result of identifying the hand shape is one finger, for example, the arrow marked icon as shown in FIG. 13(A) may be generated, or in the case of a first shape, the x-marked icon as shown in FIG. 13(B) may be generated. Or, if the identifying result of hand shape is two fingers, an icon mimicking two fingers as shown, for example, in FIG. 13(C) may be generated, or in the case of a first, an icon mimicking the fist may be generated as shown in FIG. 13(D).

A display controller 23 controls the display position of the icon generated by the icon generating unit 24 on the display 2, and is composed of a coordinate transforming unit 231 and a coordinate inverting unit 232. The coordinate transforming unit 231 transforms from the coordinates of the taken image into display coordinates on the display 2, and the coordinate inverting unit 232 inverts the lateral positions of the transformed display coordinates. That is, the coordinates of the center of gravity in the image of the portion corresponding to the user's hand detected by the position detector 224 are transformed into display coordinates on the display 2, and the lateral coordinates are inverted to display an icon in the display 2. By this manipulation, when the user moves the hand to the right, the icon moves to the right on the display screen, like a mirror action.

In thus constituted embodiment, an example of operation is described below. As shown in FIG. 8, when the user confronts the appliance incorporating the interface apparatus of the embodiment and points out one finger of the hand, the arrow cursor appearing on the display moves to an arbitrary position corresponding to the move of the hand. Then, by moving the hand to an arbitrary one of the virtual switches 204, 205, 206 shown on the display 2, the arrow cursor is moved, and when the hand is gripped to form a fist, the one of the virtual switches 204, 205, 206 is selected, and an instruction is given to the host computer 1.

In this embodiment, it is designed to recognize the shape and move of the object in the taken image, but it may be also designed to recognize either the shape or the move of the object in the taken image.

Thus, according to the invention, which comprises the motion recognizing unit for recognizing the shape and/or move of the objectin the taken image, display unit for displaying the shape and/or move of the object recognized by the motion recognizing unit, frame memory for saving the image taken by the image pickup means, and a reference image memory for storing the image taken before the image saved in the frame memory as reference image, by depicting the difference between the image in the frame memory and the reference image stored in the reference image memory in the motion recognizing unit, when the user confronts the image pickup unit and gives instruction by, for example, a hand gesture, the given hand gesture is shown on the display screen, and a virtual switch or the like shown on the display screen can be selected, for example, by the hand gesture, and a very simple manipulation of appliance without requiring input device such as mouse is realized.

(Third embodiment)

A third embodiment of the invention relates to an interface apparatus comprising contour depicting means composed of at least an image pickup unit, a motion recognizing unit for recognizing the shape and/or move of the hand of the user in the taken image, and a display unit for displaying the shape and/or move of the hand of the user recognized by the motion recognizing unit, thereby depicting the contour of the taken user image, a contour waveform operation unit for tracing the depicted contour, and calculating the relation between the angle of the contour line and the length of contour line, that is, the contour waveform, and a shape filter for filtering the contour waveform calculated by the contour waveform operation unit for generating a shape waveform expressing a specific shape, whereby composing the motion recognizing unit.

When the user confronts the image pickup unit of thus constituted interface apparatus and instructs by hand gesture, the image pickup unit picks up the user's image. The contour depicting means depicts the contour of the user's image, and the contour is transformed into an angle of the contour line corresponding to the horizontal line, that is, as a contour waveform, by the contour waveform operation unit, on the horizontal axis in the length of the contour line starting from the reference point on the contour. This contour waveform is transformed into a shape waveform expressing the uneven shape of the finger by a shape filter composed of a band pass filter in specified band, for example, a band pass filter corresponding to uneven surface of finger, and the location of the finger is calculated, and only by counting the number of pulses existing in this shape waveform, the number of projected fingers, that is, the shape of the hand can be accurately judged. On the basis of the position or shape of the hand, the given hand gesture is shown on the display screen, and, for example, a virtual switch shown on the display screen can be selected by the hand gesture, and therefore very simple manipulation of appliance is realized without requiring mouse or other input device.

Moreover, plural shape filters may be composed of plural band pass filters differing in band, and the motion of the user may be judged on the basis of the shape waveforms generated by the plural shape filters. As a result, plural shapes can be recognized.

Alternatively, plural shape filters may be composed of at least of a band pass filter in the contour waveform shape corresponding to undulations of hand, and a band pass filter in the contour waveform shape corresponding to undulations of fingers. As a result, the image is transformed into a smooth shape waveform reflecting only undulations of the hand portion or into the shape waveform reflecting only undulations of the finger.

The motion recognizing unit may be constituted by comprising coordinate table for storing the contrast of coordinates of the contour shape of the taken image of the user and the contour shape calculated by the contour shape operation unit, and a coordinate operation unit for calculating the coordinates of the location of the specified shape in the taken image, by using the wave crest location position of the shape waveform and the coordinate table. Hence, the coordinates of the contour shape are calculated, and the coordinates are issued.

The motion recognizing unit may be also composed by comprising a shape judging unit for counting the number of pulses in the shape waveform generated by the shape filter, and the shape of the object may be judged by the output value of the shape judging unit. It is hence easy to judge whether hand is projecting two fingers or gripped to form a fist, by the number of pulses.

Also the motion recognizing unit may be composed by comprising a differentiating device for differentiating the shape waveform generated by the shape filter. By differentiation, the waveform is more pulse-like, and it is easier to count the number of pulses.

Figure 14:
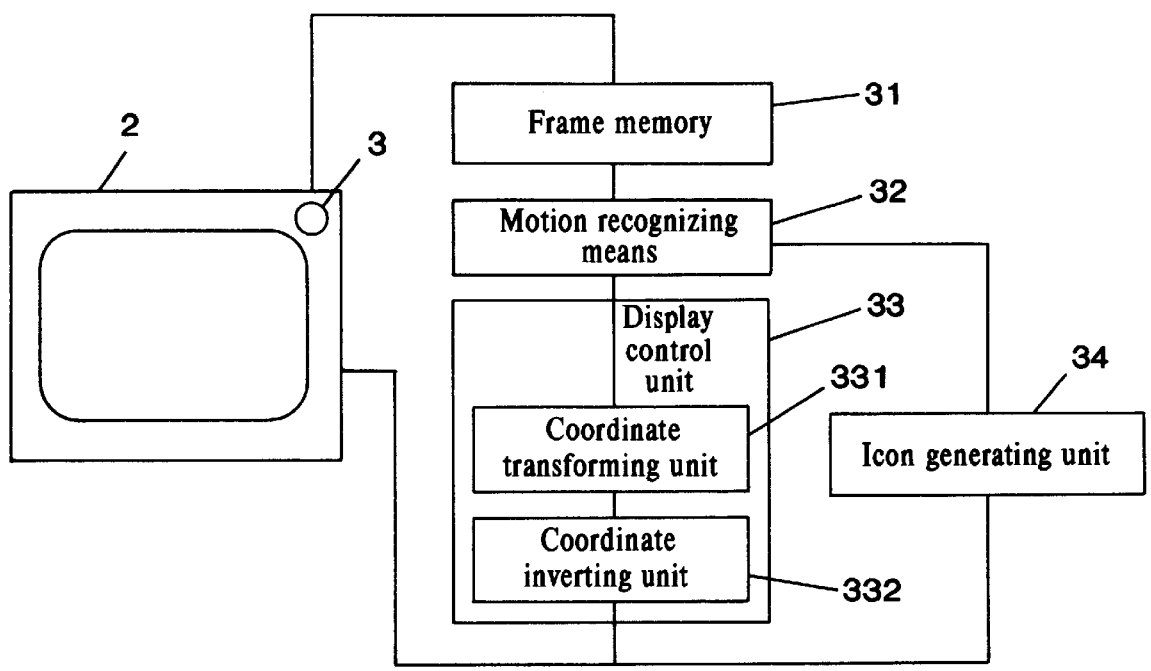
FIG. 14 is a detailed block diagram of an interface apparatus in a third embodiment of the invention.

The appearance of the embodiment of the interface apparatus of the invention is similar to the one shown in FIG. 8 relating to the second embodiment, and same parts as in the second embodiment are explained by referring to FIG. 8 and FIG. 10, and only other different parts are explained in FIG. 14 and after.

FIG. 14 is a detailed block diagram of the third embodiment of the invention. An image fed from the CCD camera 3 is stored in a frame memory 31. The motion recognizing unit 32 depicts the portion corresponding, for example, to the hand of the user from the image stored in the frame memory 31, and judges if the shape is, for example, one finger as shown in FIG. 10(A), or a fist as shown in FIG. 10(B).

Figure 15:
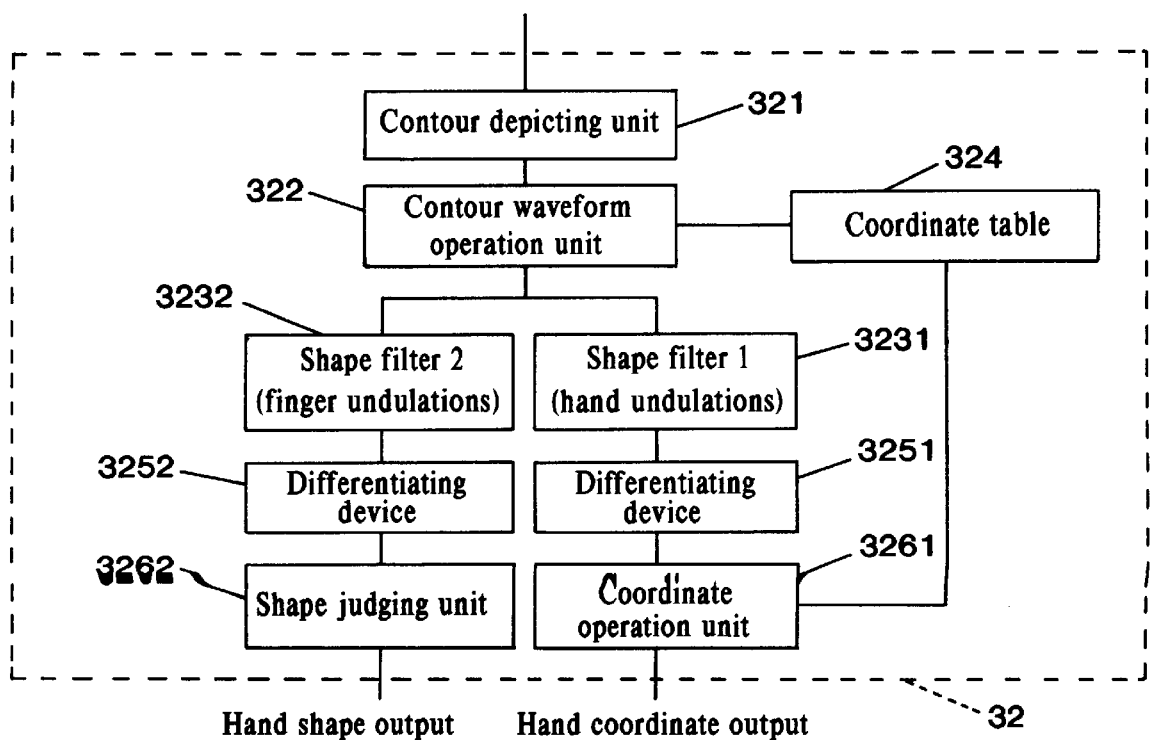
FIG. 15 is a diagram showing an example of motion recognizing unit of the interface apparatus in the third embodiment of the invention.

FIG. 15 shows a detail of execution of the motion recognizing unit 32, and its detailed operation is described while referring also to FIG. 16 to FIG. 20.

Figure 17:
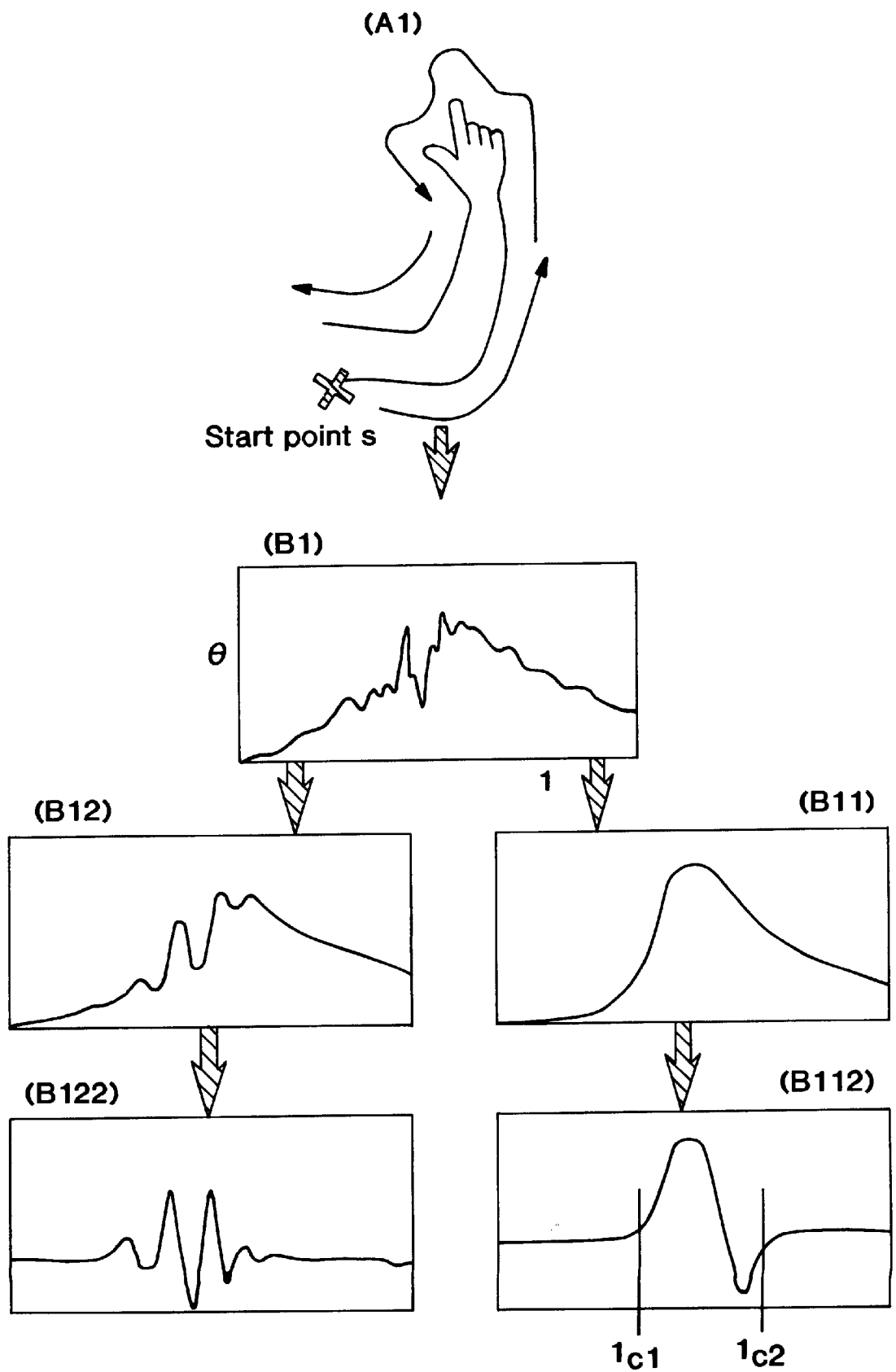
FIG. 17 is a diagram showing operation of motion recognizing unit of the interface apparatus in the same embodiment of the invention.

A contour depicting unit 321 depicts the contour shape of the object existing in the image. As an example of specific method, the image is transformed into binary data, and by depicting the edge, the contour shape can be easily depicted. FIG. 17(A1) is an example of depicted contour line, showing the hand projecting one finger.

Figure 19:
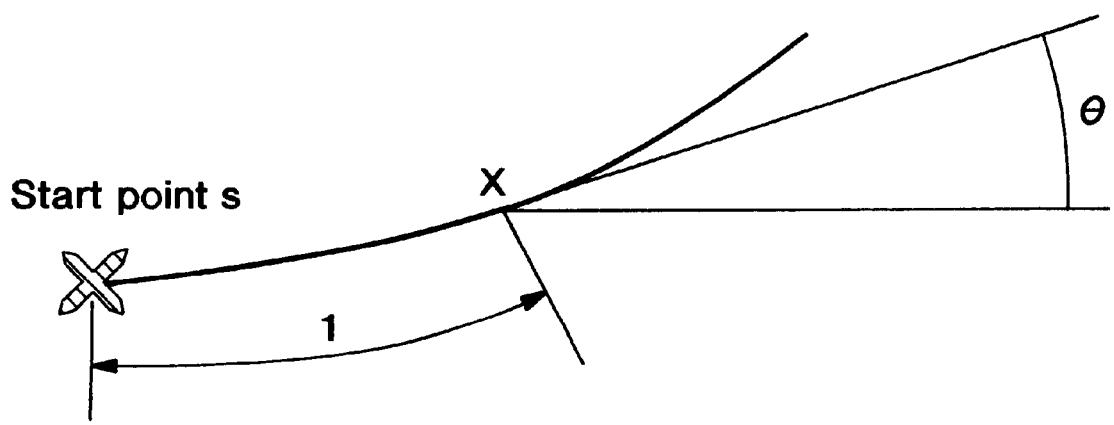
FIG. 19 is a diagram showing operation of motion recognizing unit of the interface apparatus in the same embodiment of the invention.
Figure 20:
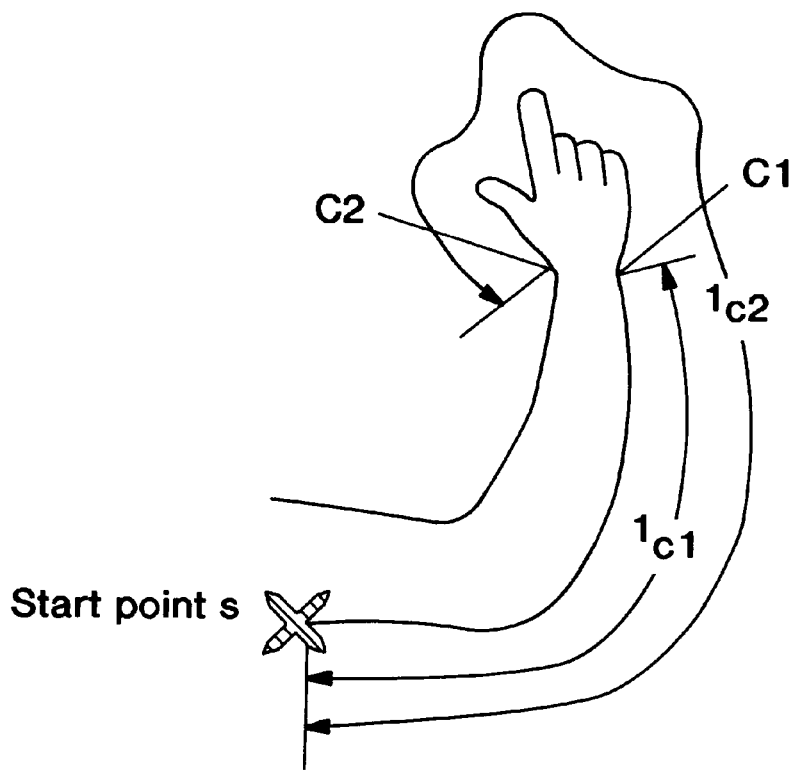
FIG. 20 is a diagram showing operation of motion recognizing unit of the interface apparatus in the same embodiment of the invention.

A contour shape operation unit 322, starting from-start point s in the diagram of the contour shape of the object depicted by the contour depicting unit 321 as shown in FIG. 17(A1), traces the contour line in the direction of arrow in the drawing (counterclockwise), depicts the angle θ from the horizontal line of the contour line at each point x on the contour line as shown in FIG. 19 as the function in terms of the distance 1 from the start points, and transforms into the waveform shape regarding the distance 1 as the time axis as shown in FIG. 17(B1), and simultaneously stores the coordinates of each point on the contour line corresponding to the distance 1 in a transformation table 324 in a table form. A shape filter 1 and a shape filter corresponding to reference numerals 3231 and 3232 respectively are filters for passing the band corresponding to the undulations of the hand portion and undulations of the finger portion, in the contour waveform shown in FIG. 17(B1).

By the shape filter 1, FIG. 17(B1) is transformed into a smooth shape waveform reflecting only the undulations of the hand portion as shown in FIG. 17(B11), and by the shape filter 2, it is transformed into the shape waveform reflecting only the undulations of the finger as shown in FIG. 17 (B12), and both are differentiated by differentiating devices 3251 and 3252, and finally differential waveforms as shown in FIG. 17(B112) and FIG. 17 (B122) are obtained. The shape judging unit 3262 judges whether the contour shape of the hand portion is two fingers as shown in FIG. 10(A) or a fist as shown in FIG. 10(B), and at the same time the coordinate operation unit 3261 calculates the coordinates of the center of gravity of the contour shape of the portion of the hand of the user. The coordinate operation unit 3261 determines positions 1c1, 1c2 of location of large pulse waveforms in the shape differential waveform shown in FIG. 17(B112), and transforms into point c1 and point c2 shown in FIG. 20 by the coordinate transformation table 324, and the center of gravity of the hand portion is calculated from the contourline of the hand portion from point c1 to point c2, and issued as hand coordinates.

Figure 18:
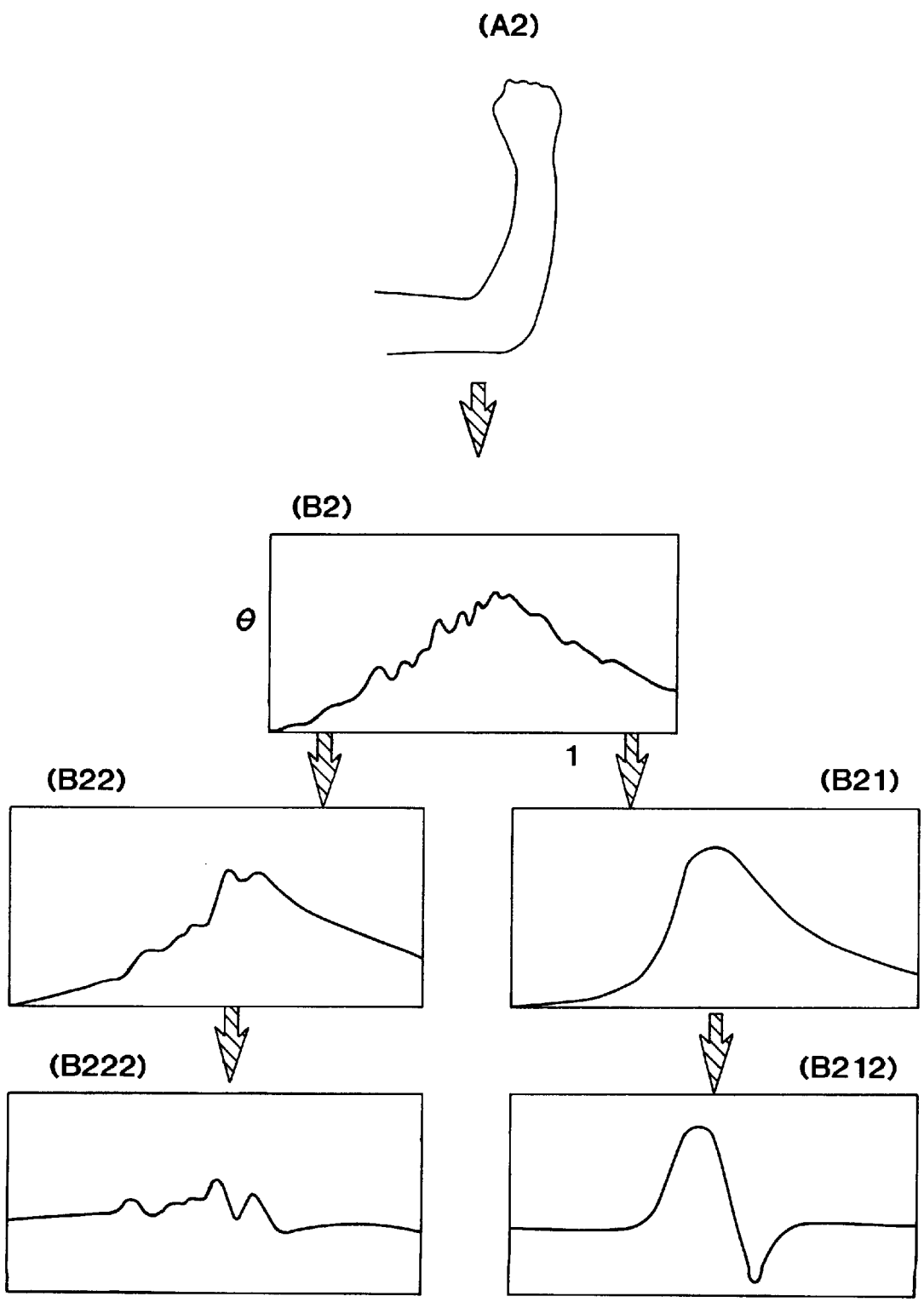
FIG. 18 is a diagram showing operation of motion recognizing unit of the interface apparatus in the same embodiment of the invention.

The shape judging unit 3262 counts and issues the number of pulse waveforms corresponding to the finger portion in the shape differential waveform in FIG. 17(B122). That is, in the case of FIG. 17(B122), since there are two large pulse waveforms corresponding to the portion of the finger, it is judged and issued as the shape of two fingers as shown in FIG. 10(A). Or when the hand is gripped as shown in FIG. 18(A2), there is almost no undulation of finger portion, and the output of the shape filter 2 is a shape waveform without undulations as shown in FIG. 18(B22), and hence the output of the differentiating device 3262 is also a shape differential waveform without pulse waveform as shown in FIG. 18(B222), and the count of pulse waveforms is 0, and it is hence judged and issued as the fist shape as shown in FIG. 10(B).

As a practical example of composition of the shape judging unit 3262, simple threshold processing method or neutral network maybe employed.

Figure 16A:
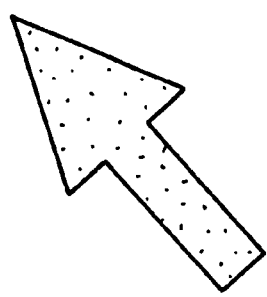
FIG. 16(A) to (D) are diagrams showing examples of icon displayed on a display screen by the interface apparatus of the same embodiment.
Figure 16B:
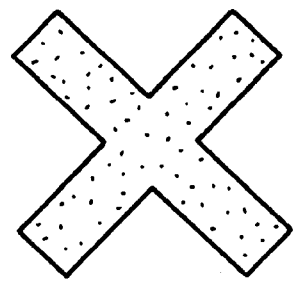

An icon generating unit 34 in FIG. 14 generates an icon image to be shown on the display on the basis of the result of identifying the shape of the hand by the shape judging means 3262 in FIG. 15. For example, if the result of identifying the hand shape is a shape of one finger, for example, an icon indicated by arrow shown in FIG. 16(A) is created, or in the case of a fist shape, an icon indicated by x mark as shown in FIG. 16(B) is created. A display controller 33 controls the display position of the icon generated by the icon generating unit 34 on the display, and is composed of coordinate transforming unit 331 and coordinate inverting unit 332. The coordinate transforming unit 331 transforms from the coordinates of the taken image into display coordinates on the display, and the coordinate inverting unit 332 inverts the lateral positions of the transformed display coordinates. That is, the coordinates of the center of gravity in the image of the portion corresponding to the user's hand issued by the coordinate operation unit 3261 in FIG. 15 are transformed into display coordinates on the display, and the lateral coordinates are inverted to display an icon in the display. By this manipulation, when the user moves the hand to the right, the icon moves to the right on the display screen, like a mirror action.

In thus constituted embodiment, an example of operation is described below. When the user confronts the appliance incorporating the interface apparatus of the embodiment and points out one finger of the hand, the arrow cursor of the icon 203 appearing on the display 2 moves to an arbitrary position corresponding to the move of the hand. Then, by moving the hand to an arbitrary one of the virtual switches 204, 205, 206 shown on the display 2, the arrow cursor is moved, and when the hand is gripped to form a fist, the one of the virtual switches is selected, and an instruction is given to the host computer 1.

Figure 16C:
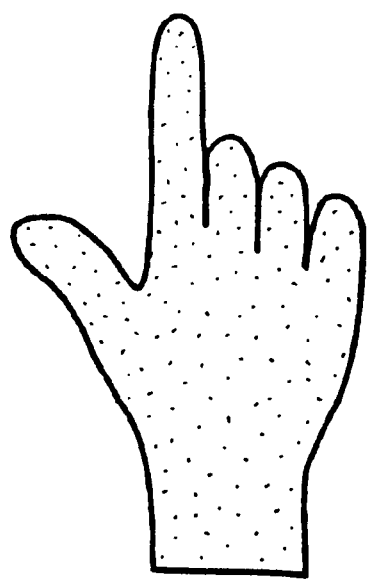
Figure 16D:
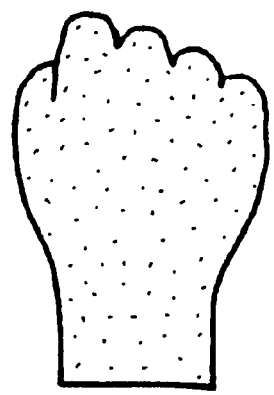

As an example of the icon to be displayed, as shown in FIGS. 16(C), (D), when the shape of the hand itself is formed into an icon, it corresponds to the move of the actual hand, and it is intuitive. More specifically, the images as shown in FIGS. 16(C) and (D) may be entered beforehand, or the contour shape data of the hand depicted by the contour depicting unit may be contracted or magnified to a desired size and used as an icon image.

Thus, in this embodiment, when the user confronts the image pickup unit of the interface apparatus and instructs, for example, by a hand gesture, the image pickup unit picks up the image of the user, and depicts the contour of the user's image, and transforms into an angle of contour line to the horizontal line, that is, into contour waveform, on the horizontal axis in the length of the contour line starting from the reference point on the contour line. This contour shape is transformed into a shape waveform expressing the uneven shape of the fingers by the shape filter composed of a band pass filter of specified band, for example, a band pass filter corresponding to undulations of fingers, and the position of the hand is calculated, and simultaneously the number of pulses existing in the shape waveform is counted, so that the number of projected fingers, that is, the shape of the shape can be accurately judged. On the basis of the position and shape of the hand, the given hand gesture is shown on the display screen, and, for example, a virtual switch shown on the display switch can be selected, and very easy manipulation of appliance is realized without requiring mouse or other input device.

(Fourth embodiment)

The foregoing embodiments relate to examples of manipulation on two-dimensional images shown on the display screen, whereas this embodiment relates to manipulation of a virtual three-dimensional image shown on a two-dimensional display screen.

Generally, assuming to grasp a virtual object in a virtual space by using a cursor, in a displayed virtual three-dimensional space, the following constitution is considered.

Figure 21:
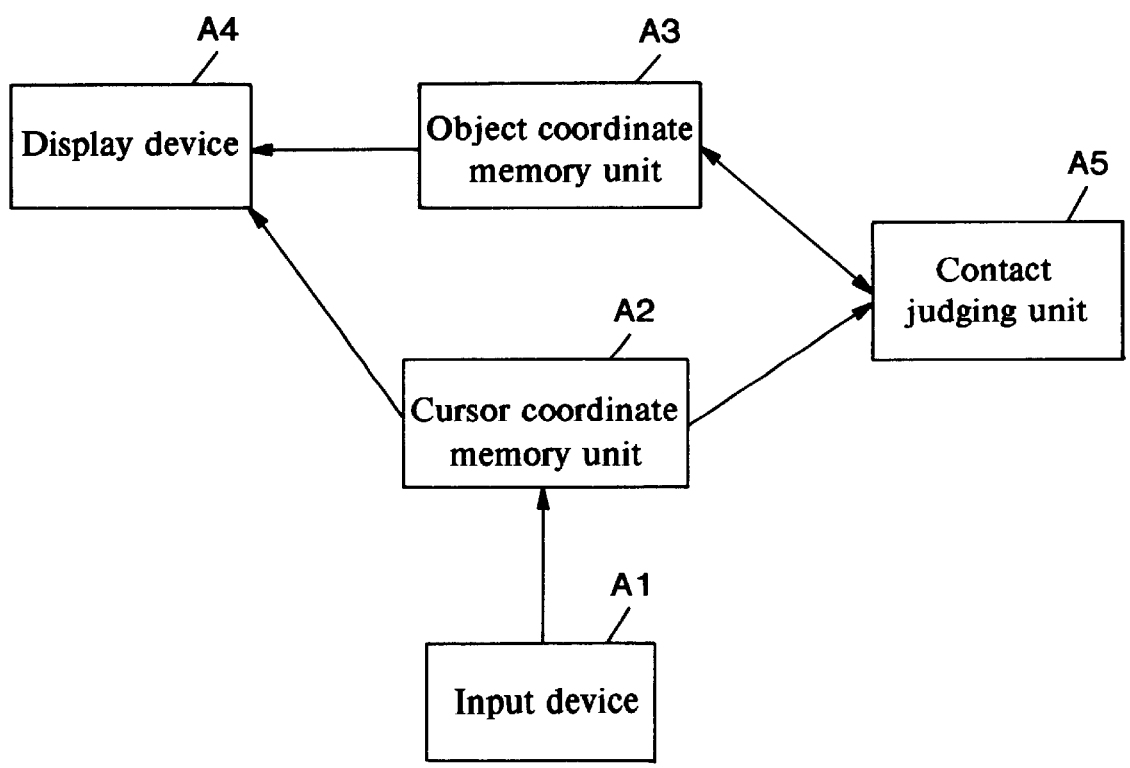
FIG. 21 is a diagram showing an interface apparatus explaining a fourth embodiment.
Figure 22A:
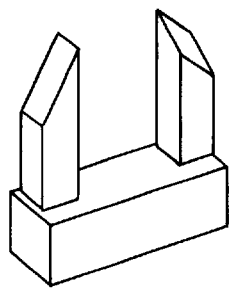
FIG. 22(a) is a diagram showing an open state of cursor in an example of a cursor used in the interface apparatus of the same embodiment.
Figure 22B:
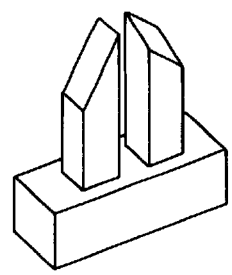
Figure 23B:
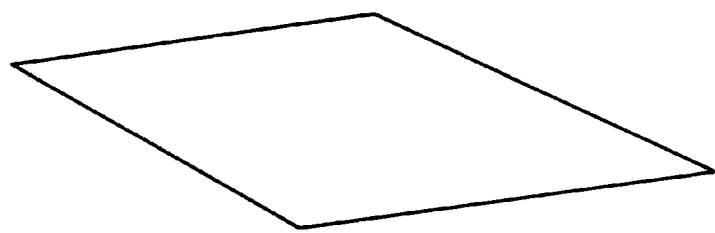
Figure 24B:
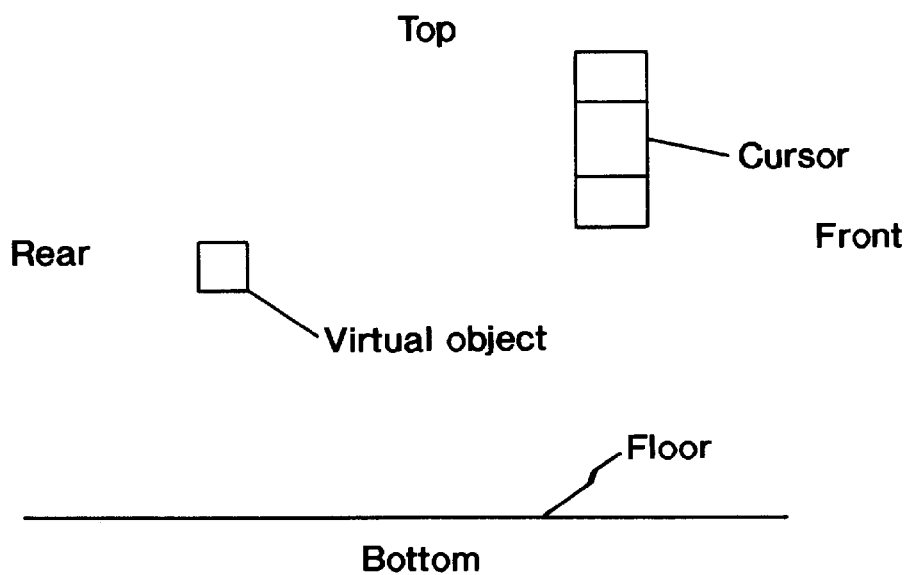

In FIG. 21, reference numeral A1 is an input device, A2 is a cursor coordinate memory unit, A3 is an object coordinate memory unit, A4 is a display device, and A5 is a contact judging unit. FIG. 22(a) and FIG. 22(b) show cursors in two-finger manipulator shape that can be expressed from the shape of the hand of the operator same as in the foregoing embodiments. FIG. 22(a) shows an open finger state, and FIG. 22(b) a closed finger state. FIG. 23 shows an example of a virtual object in a virtual space. Suppose the operator acts to grab the virtual object in a virtual three-dimensional space by using a two-finger cursor. FIG. 24(a) and FIG. 24(b) show configuration of cursor and virtual object in the virtual space when gripping the virtual object by using the cursor. FIG. 25 shows the display of the display device A4.

When manipulation of the operator is given to the input unit A1, the cursor coordinates and the two-finger interval of the cursor stored in the cursor coordinate memory device A2 are updated according to the manipulation. The display device A4 depicts the virtual space including the cursor and virtual object by using the information stored in the cursor coordinate memory unit A2 and the position information of the virtual object stored in the object coordinate memory unit A3. Herein, the contact judging unit A5 calculates whether the cursor and virtual object contact with each other in the virtual space or not, by using the information stored in the cursor coordinate memory unit A2 and the position information of the virtual object stored in the object coordinate memory unit A3. More specifically, the distance between plural surfaces composing the cursor and virtual object in the virtual space is calculated on each surface, and when the virtual object contacts between two fingers of cursor, it is judged that the cursor has grabbed the virtual object, and thereafter the coordinates of the object are changed according to the move of the cursor.

In such technique, however, the display by the display device is as shown in FIG. 25 in the case of configuration as shown in FIG. 24(a) or (b), and the operator may misjudge that the coordinates are matched although the cursor and virtual object position are not matched exactly in the virtual space. Or, in the case of using the three-dimensional display device or in the case of combined display of FIGS. 24(a) and (b), smooth manipulation is difficult due to difference in the sense of distance in the actual space and in the virtual space.

Thus, due to difference between the sense of distance in a virtual space which is a display space and the sense of distance in an actual space, or due to difference between the motion of cursor intended by the operator and the actual motion of cursor, interaction according to the intent of the operator (in this case, grabbing of the virtual object) cannot be realized smoothly in the interaction of the cursor and virtual object in virtual space (for example, when grabbing the virtual object by a virtual manipulator).

In this embodiment, the cursor can be controlled with ease by hand gesture or the like by the operator in the virtual space without making contact, and presence or absence of occurrence of interaction with the virtual object in the virtual space is determined not only by the distance between the cursor in the virtual space and the constituent element of the virtual space (the surface in the case of three-dimensional virtual space), but by inducing interaction also on the object of which distance in the virtual space is not necessarily close by the interaction judging means, the judgment whether the cursor induces interaction with the virtual object is made closer to the intent of the operator, so that the controllability of the interface may be further enhanced. It is further possible to induce interaction also on the object of which distance in the virtual space is not necessarily close.

A first constitution of the embodiment is an interface apparatus comprising display means, input means for changing the position and shape of the cursor displayed in the display means, cursor memory means for storing coordinates of a representative point representing the position of the cursor and the shape of the cursor, object memory means for storing coordinates of a representative point representing the position of display object other than the cursor and shape of the display object, and interaction judging means for judging interaction between the cursor and the display object, by using the position and shape of the cursor stored in the cursor memory means and the position and shape of the display object stored in the object memory means, wherein the interaction judging means is composed of distance calculating means for calculating the distance between at least one representative point of the cursor and at least one representative point of the display object, motion recognizing means for recognizing the move of the cursor or change of the shape, and overall judging means for determining the interaction of the cursor and display object by using the distance calculated by the distance calculating means and the result of recognition by the motion recognizing means.

According to this constitution, presence or absence of occurrence of interaction between the cursor manipulated by the operator in the virtual space and the virtual object in the virtual space is determined not only by the distance between the cursor in the virtual space and the constituent element of the virtual object (the surface in the case of a three-dimensional virtual space), but the overall judging means judges the presence or absence of occurrence of interaction by the distance between representative points calculated by the distance calculating means and the motion of the cursor recognized by the motion recognizing means, so that interaction may be induced also on the object of which distance is not necessarily close in the virtual space.

When the motion recognizing means recognizes a preliminarily registered motion in the first constitution, a second constitution may be designed so that the interaction judging means may induce an interaction on the display object of which distance calculated by the distance calculating means is below a predetermined reference.

In the first and second constitutions, by installing move vector calculating means for calculating the moving direction and moving distance of the cursor in the display space to compose the interaction judging means, a third constitution may be composed so as to determine the interaction of the cursor and display object by the interaction judging means on the basis of the moving direction of the cursor and moving distance of the cursor calculated by the move direction calculating means.

The third constitution may be modified into a fourth constitution in which the interaction judging means generates an interaction when the cursor moving distance calculated by the move vector calculating means is less than the predetermined reference value.

In third and fourth constitutions, the interaction judging means may generate an interaction on the display object existing near the extension line in the moving direction of the cursor calculated by the move vector calculating means, so that a fifth constitution may be composed.

In the first to fifth constitutions, the interaction judging means may generate an interaction when the shape of the cursor and shape of the display object become a preliminarily registered combination, which may be composed as a sixth constitution.

In the first to sixth constitutions, by composing the interaction judging means by incorporating shape judging means for recognizing the shape of the cursor and shape of the display object, a seventh constitution may be constructed so that the interaction judging means may generate an interaction when the shape of the cursor and shape of the display object recognized by the shape recognizing means coincide with each other.

In the first to seventh constitutions, by comprising sight line input means for detecting sight light direction, an eighth constitution may be composed in which the interaction judging means generates an interaction when the motion recognizing means recognizes a preliminarily registered motion, on the display object near the extension line of the sight light detected by the sight line input means.

The eighth constitution may be modified into a ninth constitution in which the interaction judging means generates an interaction when the cursor is present near the extension line of the sight line on the display object near the extension line of the sight line detected by the sight line input means and the motion recognizing means recognizes a preliminarily registered motion.

In the first to ninth constitutions, when an interaction is generated, learning means may be provided for learning the configuration of the cursor and the objective display object, and the shape of the cursor and shape of the display object, so that a tenth constitution may be composed for determining the interaction on the basis of the learning result of the learning means by the interaction judging means.

The tenth constitution may be modified into an eleventh constitution in which the interaction judging means generates an interaction when the configuration of the cursor and objective display object, or the shape of the cursor and shape of the display object may be similar to the configuration or shapes learned in the past by the learning means.

Instead of the first to eleventh constitutions, a twelfth embodiment may be composed in which the interaction judging means may be composed by incorporating coordinate transforming means for transforming the coordinates from the cursor memory unit and object memory unit to the input to the distance calculating means.

The twelfth constitution may be modified into a thirteenth constitution in which the cursor and objective display object may be brought closer to each other when an interaction is generated.

The fourth embodiment is described in detail by referring to the drawing. FIG. 26 is a block diagram of the interface apparatus of the embodiment.

In FIG. 26, reference numeral 41 is input means, 42 is cursor memory means, 43 is object memory means, 44 is display means, 45 is interaction judging means, 45a is distance calculating means, 45b is motion recognizing means, 45c is overall judging means, 45d is move vector calculating means, 45e is shape judging means, 45f is learning means, 45g is coordinate transforming means, and 46 is sight line input means.

In FIG. 26, the operator manipulates input means 41, the cursor memory means 42 changes and stores the coordinates and shape of representative point representing the position in the virtual space of the cursor, and the display means 44 shows the cursor and virtual object in two-dimensional display or three-dimensional display on the basis of the coordinates and shape of the representative point representing the position in the virtual space of the cursor stored in the cursor memory means 42 and the coordinates and shape of representative point representing the position in the virtual space of the virtual object stored in the object memory means 43.

The sight line input means 46 detects the position of the sight line of the operator on the display. The distance calculating means 45a calculates the distance between the cursor and virtual object in the virtual space on the basis of the coordinates of the representative points stored in the cursor memory means 42 and object memory means 43. The motion recognizing means 45b recognizes the motion of manipulation on the basis of the data stored in the cursor memory means 42 and object memory means 43. The move vector calculating means 45d calculates the moving direction and moving distance of the cursor in the virtual space. The shape judging means 45e judges whether the shape of the cursor and shape of the virtual object are appropriate for inducing an interaction or not. The learning means 45f stores the relation of position and shape of the cursor and virtual object when the overall judging means 45c has induced an interaction between the cursor and virtual object, and tells whether the present state is similar to the past state of inducing interaction or not.

The overall judging means 45c judges whether the cursor and virtual object interact with each other or not, on the basis of the distance between the cursor and virtual object issued by the distance calculating means 45a, the result recognized by the motion recognizing means 45b, moving direction and moving distance of cursor calculated by the move vector calculating means 45d, the position of sight line detected by the sight light input means 46, judging result of the shape judging means 45e, and degree of similarity to the past interaction issued by the learning means 45f, and changes the coordinates and shape of the representative points of the cursor and virtual object depending on the result of interaction. The coordinate transforming means 45g transforms the coordinates of the cursor and objective virtual object in the virtual space used in the distance calculation by the distance calculating means 45a so that the positions of the two may be closer to each other when the interaction judging means 45 induces an interaction.

Figure 22C:
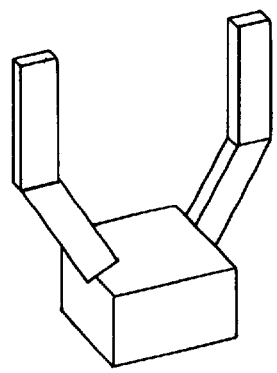
Figure 22D:
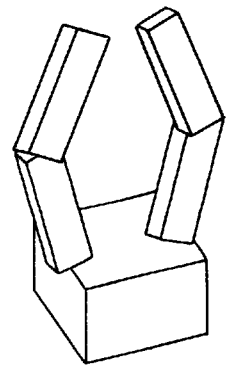
Figure 22E:
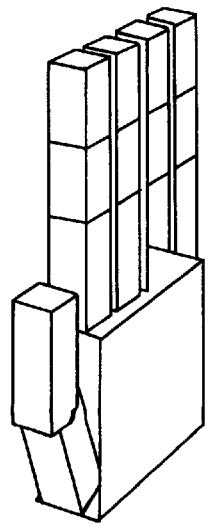
Figure 22F:
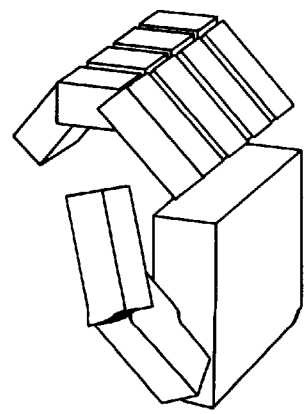

FIGS. 22(a) and (b) show a two-finger manipulator shape in a first example of the cursor used in the interface apparatus of the invention. In the diagram, the fingers are opened in (a) and the fingers are closed in (b). FIGS. 22(c) and (d) show a two-finger two-joint manipulator shape in a second example of the cursor used in the interface apparatus of the invention. In the diagram, the fingers are opened in (c) and the fingers are closed in (d). FIGS. 22(e) and (f) show a five-finger hand shape in a third example of the cursor used in the interface apparatus of the invention. In FIG. 22, the hand is opened in (e) and the hand is closed in (f).

FIGS. 23(a) and (b) show examples of the object in the virtual space used in the interface apparatus of the invention, showing a cube in (a) and a plane in (b).

In the interface apparatus thus constituted, the operation is described below. In this embodiment, it is supposed that the operator moves the cursor as shown in FIG. 22 in a three-dimensional virtual space, and moves by grabbing the virtual object as shown in FIG. 23 existing in the virtual space.

Figure 27B:
Figure 27C:
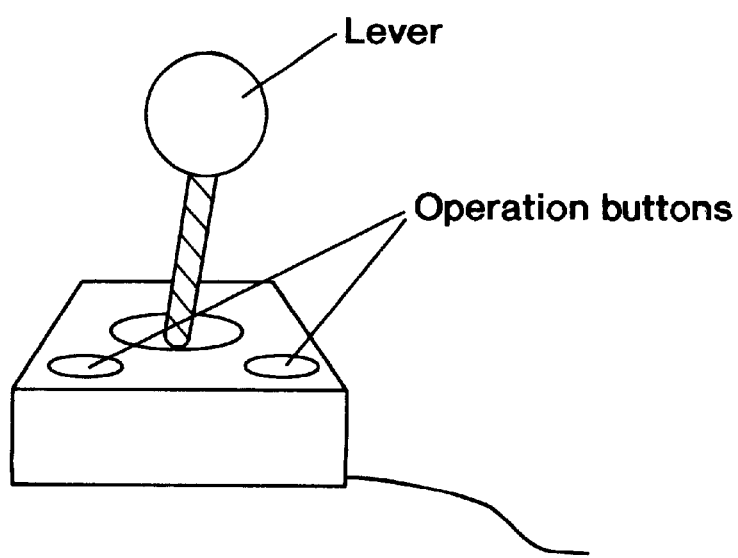

Manipulation of the operator is effected on the input means 41. In the input herein, as the input device for feeding information for varying the position or shape of the cursor, the means as shown in FIGS. 27(a) to (c), or the camera, keyboard, or command input by voice recognition can be used. FIG. 27(a) relates to a mouse, and the cursor is manipulated by moving the mouse main body or clicking its button. FIG. 27(b) relates to a data glove, which is worn on the hand of the operator, and the cursor is manipulated by reflecting the finger joint angle or position of the data glove in the actual space in the position and shape of the cursor. FIG. 27(c) relates to a joy stick, and the cursor is manipulated by combination of lever handling and operation button. When using a camera, the body or part of the body (for example, the hand) is taken by the camera, and the shape and position of the hand are read.

Figure 28B:
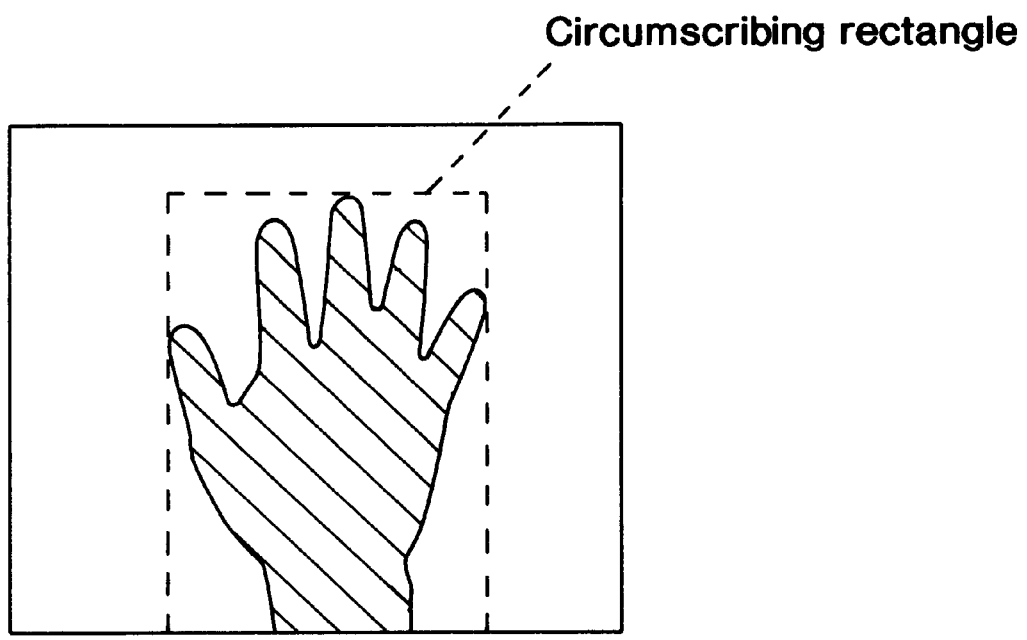

FIG. 28 shows an example of shape depiction when only the hand is taken by the camera. In FIG. 28(a), the hand is taken by the camera. The luminance of pixels of the image in FIG. 28(a) is converted into binary data in FIG. 28(b). In FIG. 28(b), it is possible to judge the degree of opening or closing of the hand by the ratio of the longer side and shorter side of a rectangle circumscribing a black region, and input of position and distance is enabled from the coordinates of center of gravity and area of the entire black pixels. The input means 41 sends the manipulation data(cursor moving distance, cursor shape changing amount, etc.) to the cursor memory means 42.

The cursor memory means 42 stores the coordinates and shape of the representative point of the cursor in the virtual space stored in the cursor memory means on the basis of the manipulation data sent out by the input means 41. As the representative point, the coordinates of center of gravity of cursor (X0, Y0, Z0) may be used. Moreover, as the representative point, the coordinates of the center of each surface composing the cursor or the coordinates of apex may be also used. As the shape, the two-finger interval d in the case of FIG. 22(a), or the internal angle θ n of the joint of each finger in the case of FIGS. 22(b), (c) (n is a joint number: as θ n becomes smaller, the joint is bent) may be used as the storage information. Moreover, as the shape, the finger tip of each finger or the coordinates of each joint in the virtual space may be also used.

The object memory means 43 stores the coordinates and shape of the representative point of the virtual object in the virtual space shown in FIG. 23 as the object of manipulation.

As the representative point, the coordinates of the center of gravity of virtual object (cube: (X1, Y1, Z1), plane: (X2, Y2, Z2)) are used. Also as the representative point, the coordinates of the center of each surface composing the virtual object or the coordinates of the apex may be used. As the shape, parameter a showing a predetermined shape is stored (herein cube is defined as α=1, and plane as α=2). Also as the shape, the coordinates of apex may be used.

The display means 44 shows the image in two-dimensional display as seen from the viewpoint preliminarily assuming the virtual space on the basis of the information of the position and shape of the cursor and virtual object stored in the cursor memory means 42 and object memory means 43. FIG. 29(a) shows a display example of display means. When the operator manipulates, the display position or shape of the cursor is changed, and the operator continues to manipulate according to the display.

The interaction judging means 45 judges if the cursor has grabbed the object or not (presence or absence of interaction) every time the cursor position changes, and when it is judged that the cursor has grabbed the object, the coordinates of the virtual object are moved according to the move of the cursor.

The distance calculating means 45a calculates the distance between the coordinates of the center of gravity of the cursor (X0, Y0, Z0) stored in the cursor memory means 42 and the coordinates of the center of gravity of the virtual object (X1, Y1, Z1), (X2, Y2, Z2) stored in the object memory means 43.

The motion recognizing means 45b recognizes the motion of "grab" as the preliminarily registered motion by using the change of shape of the cursor. In the case of the cursor in FIG. 22(a), the decreasing state of the interval d of two fingers is recognized as the "grab" action, and in the case of the cursor in FIGS. 22(b), (c),the decreasing state of the angle θ n of all fingers is understood as the "grab" action. As the technique of recognizing the motion, meanwhile, the time series changes of the parameters representing the shape (such as d and θ n mentioned above) may be used as the recognizing technique after learning specific motions preliminarily by using the time series row pattern recognition techniques (table matching, DP matching, hidden Markoff model (HMM), recurrent neutral network, etc.). The move vector calculating means 45d calculates the moving direction and moving distance of the cursor in the virtual space by using the changes of the coordinates of the center of the cursor (X0, Y0, Z0). For example, the direction and magnitude of the differential vector of the coordinates of the center of gravity of the present time t (X0, Y0, Z0)t and the coordinates of the center of gravity of a certain previous time (X0, Y0, Z0)t−1 are used as moving distance of the cursor.

The shape judging means 45e judges if the shape of the cursor for storing in the cursor memory means is proper or not for grabbing the virtual object in the shape stored in the object memory means (whether the cursor shape is appropriate or not for inducing interaction with the virtual object). Herein, when the value of the parameter a representing the shape of the object is 1, the cursor finger open state is regarded as an appropriate state. The cursor finger open state is judged, for example, when the value of d is larger than the intermediate value of maximum value of d, that is, dmax, and 0 in the case of the cursor shown in FIG. 22(a), and when all joint angles θ n are greater than the intermediate value of maximum value θ n max and 0 in the case of FIGS. 22(b), (c).

When the value of the parameter a expressing the object shape is 0, it is an appropriate state when the interval of finger tips of the cursor is narrow. The finger tips of the cursor are judged to be narrow when, for example, when the value of d is smaller than the intermediate value of the maximum value of d, d max and 0 in the case of the cursor in FIG. 22(a), or when all joint angles θ n are smaller than the intermediate value of the maximum value θ n max and 0 in the case of FIGS. 22(b), (c). As the judging method of the shape, incidentally, the parameter expressing the cursor shape (d or θ n) is stored preliminarily in the state of the cursor grabbing the virtual object in contact state in the virtual space, and when the values of the parameters coincide in a range of 130%, it may be judged to be appropriate for grabbing action.

The sight line input means 46 detects the sight line of the operator, and calculates the coordinates noticed by the operator on the display screen of the display means 44 (coordinates of notice point). As the sight light detecting means, by detecting the direction of the pupil of the operator by using a photo sensor such as CCD camera, the notice point on the screen is calculated by measuring the position of the head of the operator by using a camera or the like.

The learning means 45f stores the parameter (d or θ n) showing the shape of the cursor when the overall judging means 45c judges that the cursor has grabbed the virtual object, the parameter α showing the shape of the grabbed object, and the relative configuration of the position of the cursor and the position of the virtual object (the vector linking the center of gravity of the cursor and the center of gravity of the virtual object), and when the parameter expressing the present shape of the virtual object, the parameter expressing the shape of the surrounding virtual object, and the configuration of the present center of gravity of the cursor and the center of gravity of the surrounding virtual object are close to the past state of grabbing the object (for example, when the parameters and element values of each dimension of the vector expressing the configuration coincide with the past values within a range of ±30%), it is judged to be close to the past situation and 1 is issued, and otherwise 0 is issued. As other means of learning, meanwhile, the parameter expressing the shape of the cursor when grabbing the object in the past, the parameter a expressing the shape of the grabbed virtual object, and the relative configuration of the position of the cursor and position of the virtual object maybe learned by using neural networks or the like. As the learning items; it may be also possible to learn together with the configuration of notice point coordinates on the screen detected by the sight line detecting means 46 and coordinates of the cursor on the display screen.

The coordinates transforming means 45g transforms the coordinates used in distance calculation by the distance calculating means when grabbing the object (when an interaction is caused) so that the distance between the cursor and the objective virtual object in the virtual space may be shorter. For example, supposing the coordinates to be (100, 150, 20) and (105, 145, 50) when the cursor grabs the virtual object, the coordinates transforming means transforms the Z-coordinate having the largest difference among the coordinates as shown in formula (1).

$$Z' = 0.8 \times Z \quad (1)$$

where z is the Z-coordinate of the center of gravity of the cursor and virtual object received by the coordinates transforming means, and Z' denotes the Z-coordinate as the output of the coordinates transforming means.

In this case, the value of X-coordinate and value of Y-coordinate are not changed. Also the values stored in the cursor memory means and object memory means are not changed, and hence the screen shown by the display means is not changed. By such transformation, if the distance in the virtual space is remote, when the operator attempts to grab, thereafter the distance between the cursor and virtual object becomes shorter when calculating the distance, so that the distance calculating means can calculate the distance closer to the sense of the distance felt by the operator.

The overall judging means 45c judges the occurrence of interaction of "grab" when recognizing the preliminarily registered action of "grab" by the motion recognizing means 45b when the distance between the cursor and the virtual object issued by the distance calculating means 45a is less than a predetermined reference, and thereafter until the interaction of "grab" is terminated, the values of the coordinates of the center of gravity of the grabbed virtual object stored in the object memory means 43 are matched with the coordinates of the center of gravity of the cursor. Herein, the predetermined reference value may be a larger than the actual distance of contact of the cursor and object in the virtual space. For example, in the case of FIG. 25 (configuration of FIG. 24), if the distance between the virtual object and cursor is less than the reference value of the distance, the action of grabbing by the operator may be instructed to the input means 1, and when the motion recognizing means 45b recognizes the grabbing action, the virtual object may be grabbed and moved.

Figure 29B:
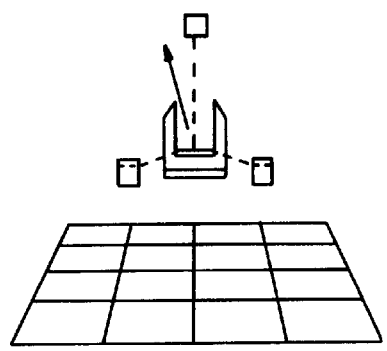

Meanwhile, the overall judging means 45c, if there are plural virtual objects below the reference of the distance, judges only the objects below the reference (for example, 90 degrees) of the angle formed by the line segment (waved line) linking the cursor and virtual object and the moving direction (arrow) of the cursor calculated by the move vector calculating means 45d as shown in FIG. 29(b), so that the operator can judge the interaction in consideration of the moving direction of the cursor in the process of manipulation (selecting the highest position of the three objects in the diagram). As for the cursor moving distance, if the moving distance is longer than the predetermined moving distance reference, interaction does not occur. Thus, when merely moving the cursor, interaction not intended by the operator is not caused.

Figure 29C:
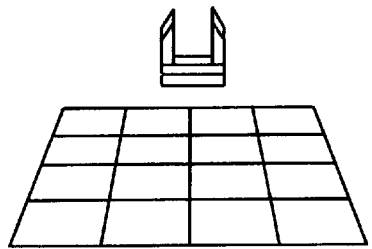

Moreover, as shown in FIG. 29(c), when plural virtual objects are satisfying the reference, the virtual object close to the position of the notice point detected by the sight line input means 46 is the object of grabbing by the overall judging means 45c (in the diagram, the object at the left side close to the "+" mark indicating the notice point is to be selected). As a result, the object can be easily selected by using the sight line of the operator.

Figure 29D:
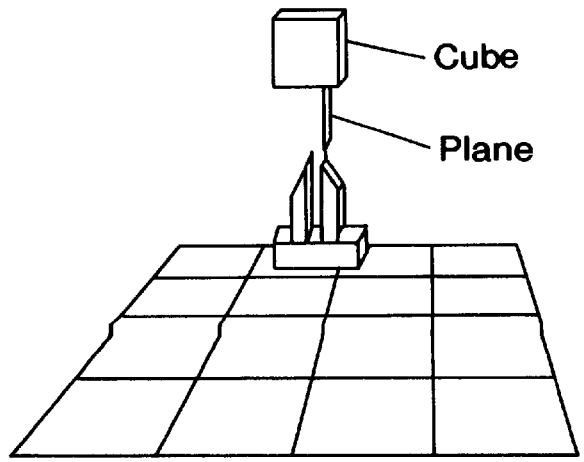

Incidentally, as shown in FIG. 29(d), if there is a close object on the screen, the virtual object coinciding with the shape of the cursor judged by the shape judging means 45e is the object of grabbing by the overall judging means 45c (in the diagram, since the finger interval of the cursor is narrow, a plane is judged to be appropriate as the object of grabbing, and hence the plane is selected). As a result, the virtual object intended by the operator can be selected by the shape of the cursor, and the operator can manipulate easily by corresponding to the cursor shape that can be easily associated when grabbing the virtual object.

The overall judging means 45c selects by priority the virtual object judged to be similar when the object was grabbed in the past by the learning means 45f. As a result, the judgment closer to the past manipulation by the operator can be reproduced, and the controllability may be enhanced.

Thus, according to the invention, presence or absence of interaction between the cursor manipulated by the operator in the virtual space and the virtual object in the virtual space is determined not only by the distance between the cursor and virtual object, but it is determined on the basis of the action, sight line or past case in the manipulation of the operator, so that the controllability may be enhanced in the interface for interaction with the virtual object by using the cursor in the virtual space.

The embodiments have been explained by referring to the action of grabbing the virtual object by using the cursor as the interaction, but similar handling is also possible in other motions, such as indicating (pointing) to the virtual object, collision, friction, impact, and remote control. Similar effects are obtained if the virtual space is a two-dimensional space or if the display means is a three-dimensional display. It may be realized by using hardware, or by using the software on the computer.

In this way, according to the embodiments, presence or absence of occurrence of interaction between the cursor manipulated by the operator in the virtual space and the virtual object in the virtual space is determined not only by the distance between the constituent elements of the cursor and virtual object in the virtual space, but the overall judging means judges presence or absence of occurrence of interaction on the basis of the distance between representative points calculated by the distance calculating means and the motion of the cursor recognized by the motion recognizing means, and therefore an interaction may be induced also on the object of which distance is not necessarily close in the virtual space, so that the input and output interface excellent in controllability may be presented. Moreover, it is not necessary to calculate the distance of all the constituent elements between the cursor and virtual object in the virtual space as required in the conventional contact judging method, and therefore the quantity of calculation is lessened, and the processing speed is enhanced.

Accordingly, the invention can recognize the shape or motion of the hand of the operator and display the feature of the shape of the recognized hand as a cursor on the screen as the special shape, so that the information displayed on the screen and the information displayed on the screen by the shape or motion of the hand can be controlled easily at superior controllability.

Moreover, the feature of the shape of the hand is displayed as cursor on the screen as the special shape, and the relation with other display objects than the cursor is judged sequentially and automatically by the interaction along the intent of the operator, so that the interface further enhanced in the controllability of manipulation of indicating or gripping the display object can be realized.

What is claimed is:

1. An interface apparatus comprising:
   recognizing means for recognizing a shape of a hand and a given motion of the hand of an operator;
   display means for displaying a visible menu programmed to correspond to the features of the shape of the hand recognized by the recognizing means on a screen; and
   control means for selecting the visible menu displayed on the screen based on the features of the shape of the hand recognized by said recognizing means and for issuing an instruction based on the recognition of the given motion of the hand recognized by said recognizing means after selecting the menu.

2. An interface apparatus as defined in claim 1, wherein the given motion is the operator's maintaining the shape of the hand for a specified time.

3. An interface apparatus of claim 2, wherein said display means displays said features of the shape of the hand on the screen as a special shape.

4. An interface apparatus comprising:
   recognizing means for recognizing a shape of a hand and a given motion of the hand of an operator, wherein the given motion is the operator's maintaining the shape of the hand for a specified time;
   display means for displaying a visible menu programmed to correspond to the features of the shape of the hand recognized by the recognizing means on a screen wherein said display means displays said features of the shape of the hand on the screen as a special shape and the special shape is an icon representing a numeral; and
   control means for selecting the visible menu displayed on the screen based on the features of the shape of the hand recognized by said recognizing means and for issuing an instruction based on the recognition of the given motion of the hand recognized by said recognizing means after selecting the menu.

5. An interface apparatus of claim 3, wherein the recognizing means recognizes a number of fingers of the hand, the display means displays the number of fingers as the special shape and the control means selects the visible menu displayed on the screen based on the number of the fingers of the hand recognized by the recognizing means.

6. An interface apparatus as defined in claim 5, wherein the special shape is an icon representing a number, and the display means emphasizes a part of the menu corresponding to the number based on the number of fingers of the hand recognized by the recognizing means.

* * * * *

UNITED STATES PATENT AND TRADEMARK OFFICE
CERTIFICATE OF CORRECTION

PATENT NO.   : 6,191,773 B1                                              Page 1 of 1
DATED        : February 20, 2001
INVENTOR(S)  : Maruno et al.

It is certified that error appears in the above-identified patent and that said Letters Patent is hereby corrected as shown below:

Title page,
Item [56], References Cited, OTHER PUBLICATIONS,
"Wideo-Based..." should read -- Video-Based... --.

Insert -- Japanese language search report for Int'l Appn. No. PCT/JP96/01124. --

Insert -- English translation of Japanese language search report for Int'l Appn. No. PCT/JP96/01124. --

Title page,
Item [56], References Cited, FOREIGN PATENT DOCUMENTS,
Insert:
| | | |
|---|---|---|
| 7-84714 | 3/1995 | Japan |
| 6-20055 | 1/1994 | Japan |
| 7-57103 | 3/1995 | Japan |
| 5-66908 | 3/1993 | Japan |
| 6-12177 | 1/1994 | Japan |
| 2-190776 | 7/1990 | Japan |
| 4-289910 | 10/1992 | Japan |
| 4-238524 | 8/1992 | Japan |
| 5-27906 | 2/1993 | Japan |
| 8-212327 | 8/1996 | Japan |

Signed and Sealed this

Fifth Day of March, 2002

*Attest:*

JAMES E. ROGAN
*Attesting Officer*          *Director of the United States Patent and Trademark Office*